(12) United States Patent
Park et al.

(10) Patent No.: US 6,577,352 B1
(45) Date of Patent: Jun. 10, 2003

(54) METHOD AND APPARATUS FOR FILTERING CHROMINANCE SIGNALS OF IMAGE

(75) Inventors: Cheol Soo Park, Kyoungki-do (KR); Joo Hee Moon, Seoul (KR); Hae Kwang Kim, Seoul (KR)

(73) Assignee: Hyundai Electronics Ind. Co., LTD, Kyoungki-Do (KR)

( * ) Notice: Subject to any disclaimer, the term of this patent is extended or adjusted under 35 U.S.C. 154(b) by 0 days.

(21) Appl. No.: 09/335,636

(22) Filed: Jun. 18, 1999

(30) Foreign Application Priority Data

Jun. 30, 1998 (KR) ........................ 1998-26100
May 18, 1999 (KR) ........................ 1999-17879

(51) Int. Cl.⁷ .................................. H04N 5/23
(52) U.S. Cl. .................. 348/624; 348/587; 348/645; 382/167; 382/260
(58) Field of Search ................. 348/624, 630, 348/644, 645, 646, 647, 649, 713, 587–591, 592, 617, 621, 631, 627, 576, 577; 382/162, 164, 165, 167, 260, 261; 345/607; 358/464, 453, 462, 512, 516, 526, 538; H04N 5/23

(56) References Cited

U.S. PATENT DOCUMENTS

| | | | | |
|---|---|---|---|---|
| 5,268,967 A | * | 12/1993 | Jang et al. ............... 382/132 |
| 5,323,232 A | * | 6/1994 | Otaka et al. .............. 348/472 |
| 5,495,297 A | * | 2/1996 | Fujimori et al. ........... 348/590 |
| 5,631,976 A | * | 5/1997 | Bolle et al. ............... 358/464 |
| 5,640,200 A | * | 6/1997 | Michael .................... 348/126 |
| 5,748,789 A | * | 5/1998 | Lee et al. .................. 382/239 |
| 5,748,804 A | * | 5/1998 | Surka .................... 235/462.08 |
| 5,761,339 A | * | 6/1998 | Ikeshoji et al. ........... 358/462 |
| 5,778,104 A | * | 7/1998 | Kowalski .................. 382/162 |
| 5,844,568 A | * | 12/1998 | Luther ..................... 345/589 |
| 6,071,004 A | * | 6/2000 | Le Gall et al. ............ 382/232 |
| 6,128,046 A | * | 10/2000 | Totsuka et al. ............ 348/590 |
| 6,192,162 B1 | * | 2/2001 | Hamilton, et al. ......... 358/463 |

* cited by examiner

Primary Examiner—John Miller
Assistant Examiner—Brian Yenke
(74) Attorney, Agent, or Firm—J. Harold Nissen; Lackenbach Siegel LLP

(57) ABSTRACT

An image chrominance signal filtering method and apparatus in which object chrominance information and background chrominance information are extracted in an image format conversion process, based on shape information of luminance signals, and then decimation-filtered or interpolation-filtered. In accordance with the method and apparatus of the present invention, it is possible to avoid a color bleeding phenomenon occurring at the boundaries of objects in an image. Accordingly, there is an advantage in that a degradation in picture quality is prevented.

24 Claims, 21 Drawing Sheets

METHOD AND APPARATUS FOR FILTERING CHROMINANCE SIGNALS OF IMAGE

BACKGROUND OF THE INVENTION

1. Field of the Invention

The present invention relates to object-based image filtering, and more particularly to a method and apparatus for filtering chrominance signals of an image, in which chrominance signals of a frame are sorted into those associated with an object in the frame and those associated with the background in the frame, so that the sorted chrominance signals are filtered independent of each other, thereby avoiding a color bleeding phenomenon occurring due to a signal interference between the chrominance signals respectively associated with the object and background.

2. Description of the Prior Art

Known video coding schemes include a frame-based coding scheme in which the entire portion of a rectangular frame or picture is encoded, and an object-based coding scheme in which only arbitrary shape regions of a rectangular frame are encoded. For the object-based coding scheme, there are various standards such as MPEG-4 and JPEG2000 proposed by International Standardization Organization/International Electrotechnical Commission Joint Technical Committee 1/Sub Committee 29/Working Group 11 (ISO/IEC JTC1/SC29/WG11).

The object-based coding scheme, which uses shape information, is a method in which particular regions or objects of interest or need by the user are extract from an image sequence in accordance with a segmentation method, encoded, and then reconstructed in a frame in accordance with a predetermined order. In such an object-based coding, shape information is used in order to distinguish extracted objects from one another. Such shape information is information for sorting an image into object regions and non-object regions (namely, background). Using this information, it is possible to achieve a signal processing based on object regions of an image in place of the entire region of the image in both an encoder and a decoder. Such shape information may be described in the form of binary shape information or gray scale shape information. The binary shape information is used to distinguish two objects in an image sequence from each other whereas the gray scale shape information is used to distinguish a plurality of objects in an image sequence from one another. For such an object distinction, the binary shape information has a value selected from two values of, for example, 0 and 1, or 0 and 255. On the other hand, for the same purpose, the gray scale shape information has a value in a certain range of, for example, 0 to 255. Shape information used in an object-based image processing includes luminance shape information associated with luminance components of objects in an image signal and chrominance shape information associated with chrominance components of those objects. In particular, shape information associated with chrominance components of objects in an image signal is extracted by sub-sampling luminance shape information, taking into consideration the sampling rate of the image signal and the relationship between the luminance and chrominance signal components depending on the picture type.

For a video scanning scheme used in image processing, there are mainly two schemes, that is, a progressive scanning scheme and an interlaced scanning scheme. In the progressive scanning scheme, an image corresponding to one frame consists of samples acquired at the same sampling time. On the other hand, in the interlaced scanning scheme, an image corresponding to one frame consists of two field sample images, that is, an upper field sample image and a lower field sample image respectively acquired at different sampling times.

In most conventional video coding and processing schemes, an image is processed by frames. For this reason, there are various problems involved in application of those schemes to the object-based coding and processing. In particular, such problems occur remarkably in association with the boundary of an object having an arbitrary shape because the frame-based processing does not take into consideration this object boundary. One problem is a color bleeding phenomenon. That is, chrominance signals associated with the boundary of an object may bleed after being subjected to an image format conversion using a filtering process. Such a color bleeding phenomenon results in a serious problem occurring in processing of images scanned in an interlaced fashion in technical fields such as a broadcasting field required to provide video of a high picture quality.

It is generally known that the sense of sight of the human being is less sensitive to chrominance signals than to luminance signals. For this reason, techniques for decimating/ interpolating chrominance signals are mainly used for the purpose of a transmission for video signals in a reduced data amount. FIG. 1 schematically illustrates a filtering procedure for decimating or interpolating chrominance signals in a state in which the bandwidth of those chrominance signals is limited to a desired range.

Referring to FIG. 2, a conventional filtering method is illustrated which involves multiplying input signals Ci by appropriate filter coefficient Wj, respectively, and then adding the resultant signals together. Generally, filters have characteristics determined by their filter coefficients and relationships among those filter coefficients, respectively. Where a median filtering is conducted, filter coefficients for respective input signals may be rendered to be substantially the same because the median filtering is adapted to derive average characteristics of those input signals. The number of filter coefficients and the number of filter taps may be optionally determined in accordance with the use purpose thereof determined by the user. Now, such a conventional filtering method will be described in detail. Where a filtering process is conducted to produce a filtered chrominance signal A, the filtering result obtained through the filters shown in FIG. 2 can be expressed by the following expression 1:

$$A = W_1 \times C_{i-2} + W_2 \times C_i + W_3 \times C_{i+1} + W_4 \times C_{i+1} + W_5 \times C_{i+2} + W_6 \times C_{i+3} \quad \text{[Expression 1]}$$

where, "$C_i$" represents a chrominance component of an image, namely, a chrominance signal, and "$W_j$" represents a filter coefficient.

Where this conventional filtering method is applied, as it is, to the object-based video coding and processing, a color bleeding phenomenon may occur. For example, where signals used to produce a filtered chrominance signal A include those associated with a different image region or object from that of the remaining ones, an interference may occur between those signals different from each other. Due to such an interference, a color bleeding phenomenon occurs which results in a degradation in picture quality. Such a phenomenon becomes severe at the boundaries of objects. Assuming that a pixel to be filtered is associated with an object region in the case of FIG. 2 and that "$C_{i-1}$", "$C_{i+1}$", and "$C_{i+2}$" have a value of 255 corresponding to an object value, "$C_{i-2}$", "$C_i$" and "$C_{i+3}$" have a value of 0 corresponding to a background value, and "$W_1$", "$W_2$", "$W_3$", "$W_4$", "$W_5$", and "$W_6$" have values of 0.1, 0.2, 0.4, 0.6, 0.3, and 0.2, respectively, the value of a chrominance signal A obtained after the filtering for the pixel is 131.58 (A=131.58=0×0.1+255×0.2+0×0.4+ 255×0.6+255×0.3+0×0.2). Accordingly, it can be understood that the chrominance signal of the pixel having a value of 255 corresponding to the object value is affected by the chrominance signals of pixels arranged the filtered pixel while having a value of 0 corresponding to the background value, thereby causing the filtered pixel to be degraded in picture quality from the value of 255 to the value of 131.58. As a result, a gray strip is formed around the object. Such a color bleeding phenomenon becomes severe at an increased number of filter taps.

SUMMARY OF THE INVENTION

Therefore, an object of the invention is to eliminate a color bleeding phenomenon involved in the case in which the above mentioned conventional filtering method is applied to object-based image processing, and to provide a method and apparatus for filtering chrominance signal of an image, in which chrominance signals of a frame are sorted into those associated with an object in the frame and those associated with the background in the frame, so that the sorted chrominance signals are filtered independent of each other, thereby avoiding a color bleeding phenomenon occurring due to a signal interference between the chrominance signals respectively associated with the object and background, and, thus, achieving an improvement in picture quality.

In accordance with one aspect, the present invention provides a method and apparatus for filtering chrominance signals of an image using a decimation filter, comprising the steps of: determining whether or not there are, in taps of the decimation filter, chrominance samples associated with an object region different from that of chrominance samples to be filtered; and if there are chrominance samples, to be filtered, associated with a different object region from that of other chrominance samples to be filtered, then marking the chrominance samples associated with the different object region, and reproducing, for the marked chrominance samples, a chrominance sample associated with the same object region as that of the other chrominance samples to be filtered.

In accordance with another aspect, the present invention provides a method and apparatus for filtering chrominance signals of an image using a decimation filter, comprising the steps of: (A) if the number of source object chrominance samples existing in taps of the decimation filter is a positive integer less than the number of the filter taps, then determining whether a pixel, to be filtered, of an input image is an object chrominance pixel or a background chrominance pixel, based on shape information of luminance signals of the image; (B) if it is determined at the step (A) that the pixel is a background chrominance pixel, then marking object chrominance samples existing in the filter taps, and reproducing background chrominance samples for the marked object chrominance samples, respectively; (C) if it is determined at the step (A) that the pixel is an object chrominance pixel, then marking background chrominance samples existing in the filter taps, and reproducing object chrominance samples for the marked background chrominance samples, respectively; and (D) computing pixel values of all chrominance samples including the reproduced samples obtained after the completion of the step (B) or the step (C) using respective filter coefficients of the filter taps.

In accordance with another aspect, the present invention provides a method for filtering chrominance signals of an image using an interpolation filter, comprising the steps of: determining whether or not there are, in taps of the filter, decimated chrominance samples associated with an object region different from that of decimated chrominance samples to be filtered; and if there are decimated chrominance samples, to be filtered, associated with a different object region from that of other decimated chrominance samples to be filtered, then marking the decimated chrominance samples associated with the different object region, and reproducing, for the marked decimated chrominance samples, a decimated chrominance sample associated with the same object region as that of the other decimated chrominance samples to be filtered.

In accordance with another aspect, the present invention provides a method for filtering chrominance signals of an image using an interpolation filter, comprising the steps of: (A) if the number of decimated object chrominance samples existing in taps of the interpolation filter is a positive integer less than the number of the filter taps, then determining whether a pixel, to be filtered, of an input image is a decimated object chrominance pixel or a decimated background chrominance pixel, based on shape information of luminance signals of the image; (B) if it is determined at the step (A) that the pixel is a decimated background chrominance pixel, then marking decimated object chrominance samples existing in the filter taps, and reproducing decimated background chrominance samples for the marked decimated object chrominance samples, respectively; (C) if it is determined at the step (A) that the pixel is an decimated object chrominance pixel, then marking decimated background chrominance samples existing in the filter taps, and reproducing decimated object chrominance samples for the marked decimated background chrominance samples, respectively; and (D) computing pixel values of all chrominance samples including the reproduced samples obtained after the completion of the step (B) or the step (C) using respective filter coefficients of the filter taps, thereby filtering the chrominance signals.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
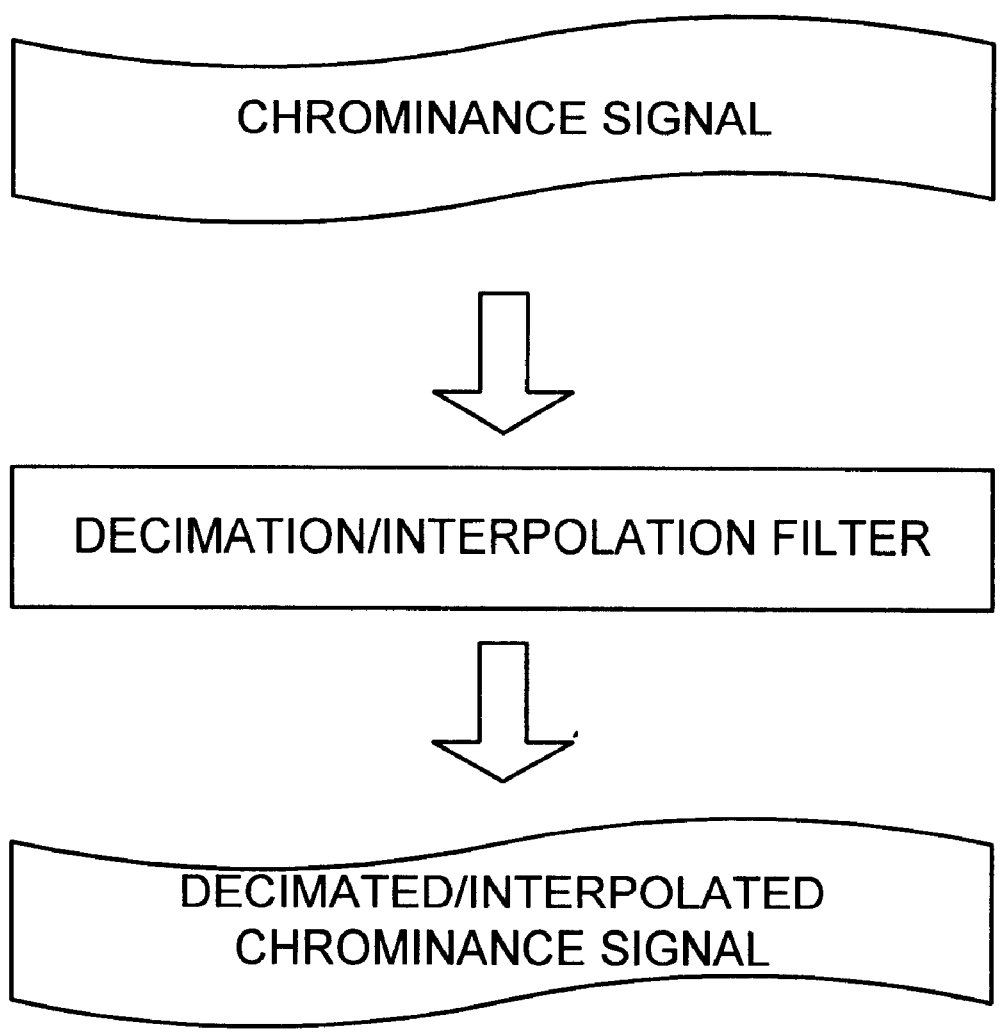
FIG. 1 is a flow chart illustrating a conventional method for filtering chrominance signals of an image.
Figure 2:
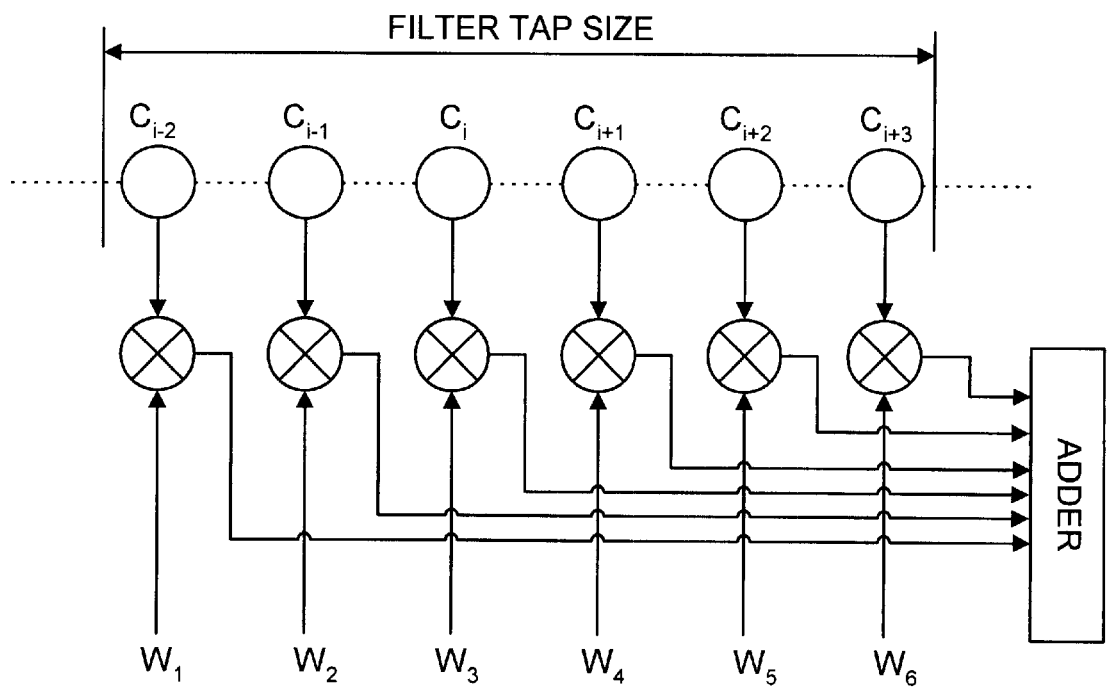
FIG. 2 is a block diagram illustrating a conventional apparatus for filtering chrominance signals of an image.

The present invention proposes a decimation filtering and an interpolation filtering for chrominance signals of an image are proposed in order to eliminate a color bleeding phenomenon occurring at the boundaries of objects included in the image in a process for converting the image into an image format having shape information. In accordance with the present invention, the decimation filtering may be applied to the case in which an image of a 4:4:4 or 4:2:2 format is down-converted into a 4:2:0 format whereas the interpolation filtering may be applied to the case in which an image of a 4:2:0 format is up-converted into a 4:2:2 or 4:4:4 format. However, they are not limited to those cases.

In accordance with a filtering method of the present invention, shape information about chrominance signals obtained by sub-sampling associated luminance signals is used to discriminate whether chrominance signals used in a process for filtering an image is associated with the boundary of an object included in the image or with the same object region. There are various sub-sampling methods. For interlaced images, it is desirable to sub-sample only for luminance signals in the same field as that of chrominance signals to be produced, taking into consideration the characteristics of the interlaced images with respect to the video signal sampling and scanning scheme, in order to avoid an inconsistency of the chrominance signals with the corresponding luminance signals which may occur in association with objects. For instance, where at least one of shape information of adjacent 2×2 luminance signals included in the same field and influenced by a chrominance signal is associated with an object, the shape information of the chrominance signal is sub-sampled as an objet. Otherwise, the shape information of the chrominance signal is sub-sampled as a background.

For the convenience of explanation, chrominance signals of a 4:2:2 image are referred to as "source chroma samples" in so far as a down conversion is conducted for the image whereas those chrominance signals are referred to as "interpolated chroma samples in so far as an up conversion is conducted for the image. For both the down and up conventions, chrominance signals of a 4:2:0 image are referred to as "decimated chroma samples. Source, interpolated and decimated chroma samples each containing shape information of an object are referred to as "source object chroma samples", "decimated object chroma samples", and "interpolated object chroma samples", respectively. On the other hand, source, interpolated and decimated chroma samples each containing shape information of the background are referred to as "source background chroma samples", "decimated background chroma samples", and "interpolated background chroma samples", respectively.

In accordance with the present invention, decimation filtering and interpolation filtering are conducted using source, decimated, and interpolated chroma samples produced as mentioned above.

Figure 3:
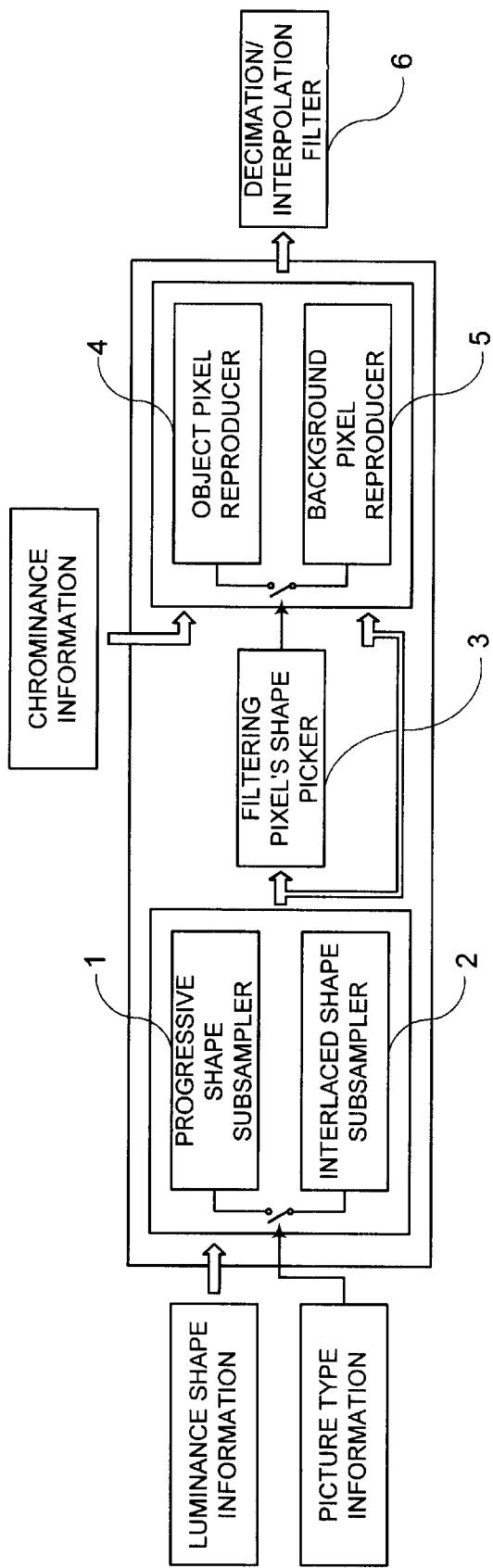
FIG. 3 is a block diagram illustrating a decimation and interpolation filtering system for object-based chrominance signals in accordance with the present invention.

FIG. 3 is a block diagram illustrating a decimation and interpolation filtering system for object-based chrominance signals in accordance with the present invention. Referring to FIG. 3, a progressive shape subsampler 1 receives luminance shape information of an image, to be filtered, along with information about the picture type of the image. The progressive shape subsampler 1 sub-samples the image when the image is determined to be a progressive image, based on the information about the picture type of the image, thereby extracting chrominance shape information. An interlaced shape subsampler 2 also receives the luminance shape information of the image along with information about the picture type of the image. The interlaced shape subsampler 2 sub-samples the image when the image is determined to be an interlaced image, based on the information about the picture type of the image, thereby extracting chrominance shape information.

The chrominance shape information from the progressive shape subsampler 1 and the chrominance shape information from the interlaced shape subsampler 2 are applied to a filtering pixel's shape picker 3. Based on the received chrominance shape information, the filtering pixel's shape picker 3 determines whether or not the pixel to be filtered corresponds to an object chrominance pixel. The filtering pixel's shape picker 3 serves to control inputting of data to filter taps in such a fashion that those filter taps are filled only with data associated with the object or only with data associated with the background. There are also an object chrominance pixel reproducer 4 and a background chrominance pixel reproducer 5 which serve to reproduce data to be input to the filter in accordance with the method of the present invention.

Figure 4:
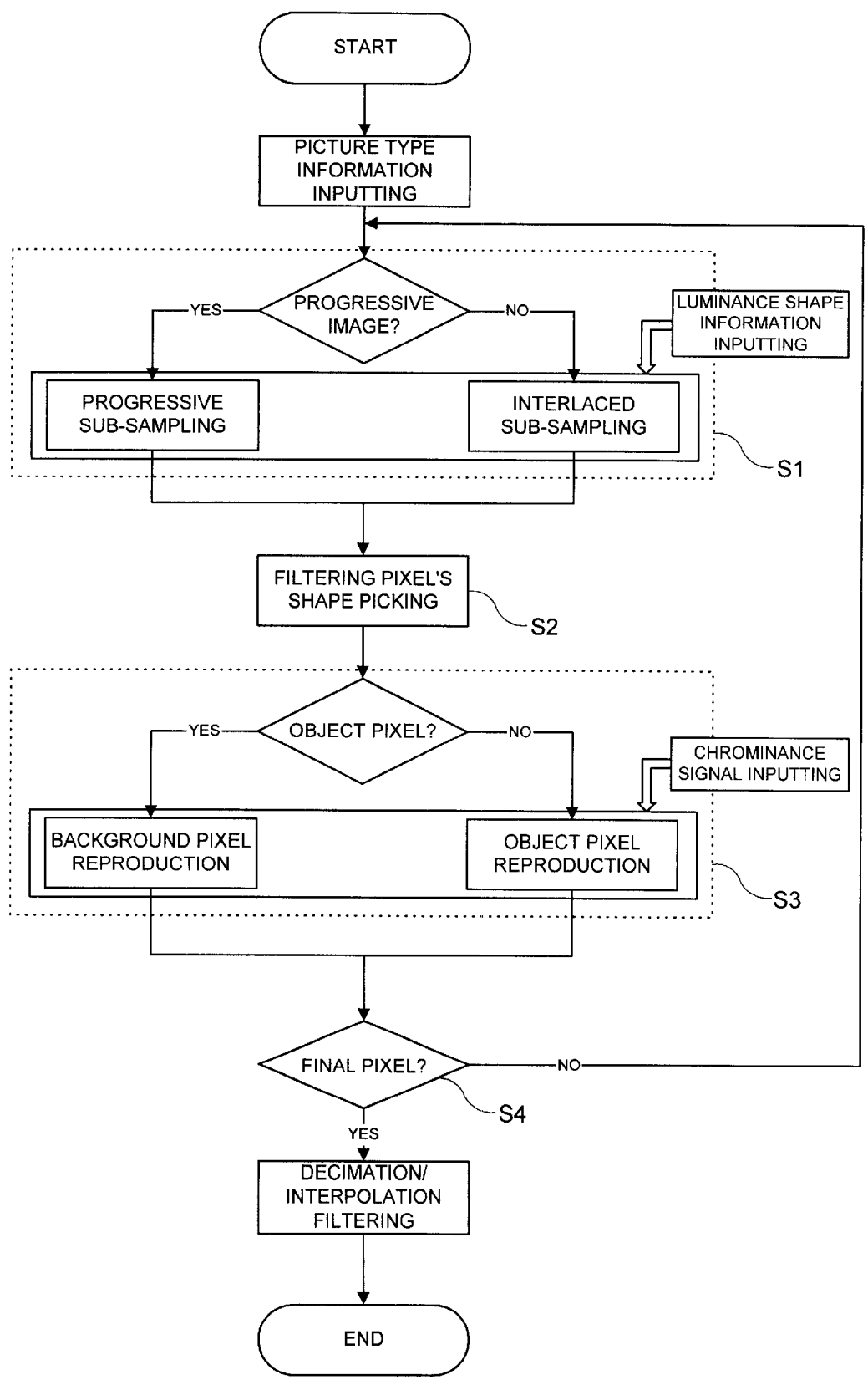
FIG. 4 is a flow chart illustrating a filtering operation of the decimation and interpolation filtering system of FIG. 3 for object-based chrominance signals.

The filtering operation of the decimation and interpolation filtering system of FIG. 3 for object-based chrominance signals is conducted as shown in FIG. 4. That is, when information about the picture type of an image to be filtered is input, the system sub-samples luminance shape information of the input image to extract chrominance shape information, taking into consideration the correlation of luminance and chrominance signals determined on the basis of the picture type of the image (Step S1). Where the input image is determined to be a progressive image, the sub-sampling is executed in a progressive fashion. On the other hand, where the input image is not determined to be an interlaced image, the sub-sampling is executed in an interlaced fashion using the input luminance shape information. Thereafter, a filtering pixel's shape picking step is executed (Step S2). At the filtering pixel's shape picking step, shape information of a chrominance signal to be currently filtered is picked from the extracted chrominance shape information of the image. It is then determined whether or not the picked chrominance shape information is associated with an object. A pixel reproduction is executed, based on the picked chrominance shape information (Step S3). Here, "reproduction" is a procedure for removing existing values, and then allocating new values in place of those removed values, respectively. Where the picked chrominance shape information is associated with an object, a background pixel reproduction is executed. In the background pixel reproduction, all background pixel chrominance values existing in the filter taps are replaced with object pixel chrominance values, respectively. On the other hand, the picked chrominance shape information is associated with the background, an object pixel reproduction is executed. In the object pixel reproduction, all object chrominance pixel values existing in the filter taps are replaced with background chrominance pixel values, respectively. Thus, the decimation or interpolation filtering for the input image can be executed using pixels each reproduced using chrominance pixel values all being associated with the object or all being associated with the background.

After completing the pixel reproduction, it is determined whether or not the pixel being currently processed is the last pixel (Step S4). Where it is determined that the current pixel is not the last pixel, the above procedure is repeated from step S1. On the other hand, where it is determined that the current pixel is the last pixel, a decimation/interpolation filtering is executed in accordance with a well-known method. Thus, a decimated or interpolated chrominance signal is acquired.

Figure 5:
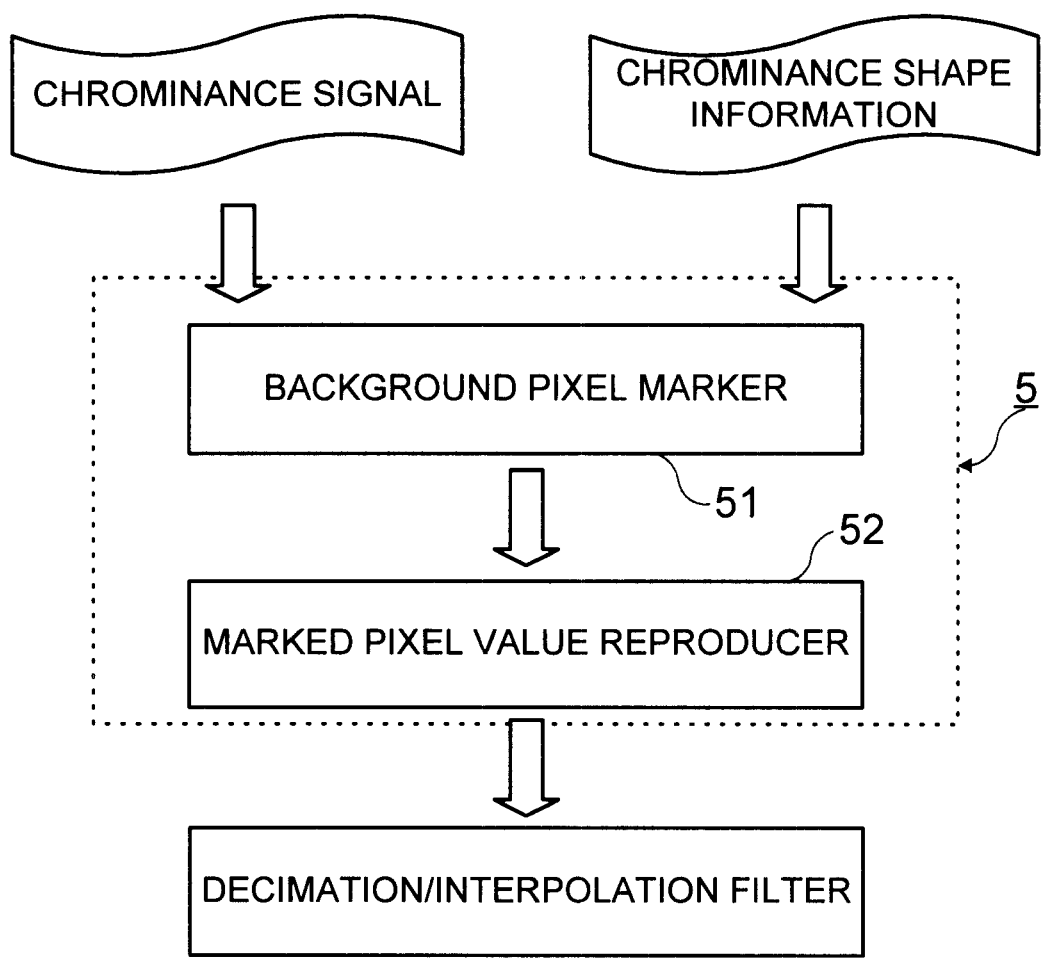
FIG. 5 is a block diagram illustrating a background chrominance pixel reproducer according to the present invention.

In accordance with the present invention, the background chrominance pixel reproducer 5 of FIG. 3 includes a background chrominance pixel marker 51 for receiving a chrominance signal along with chrominance shape information and marking background chrominance pixels having values to be removed, based on the received chrominance shape information, and a marked-pixel value reproducer 52 for replacing the values of the marked background chrominance pixels with appropriate object chrominance pixel values. This configuration of the background chrominance pixel reproducer 5 is illustrated in FIG. 5.

Figure 6:
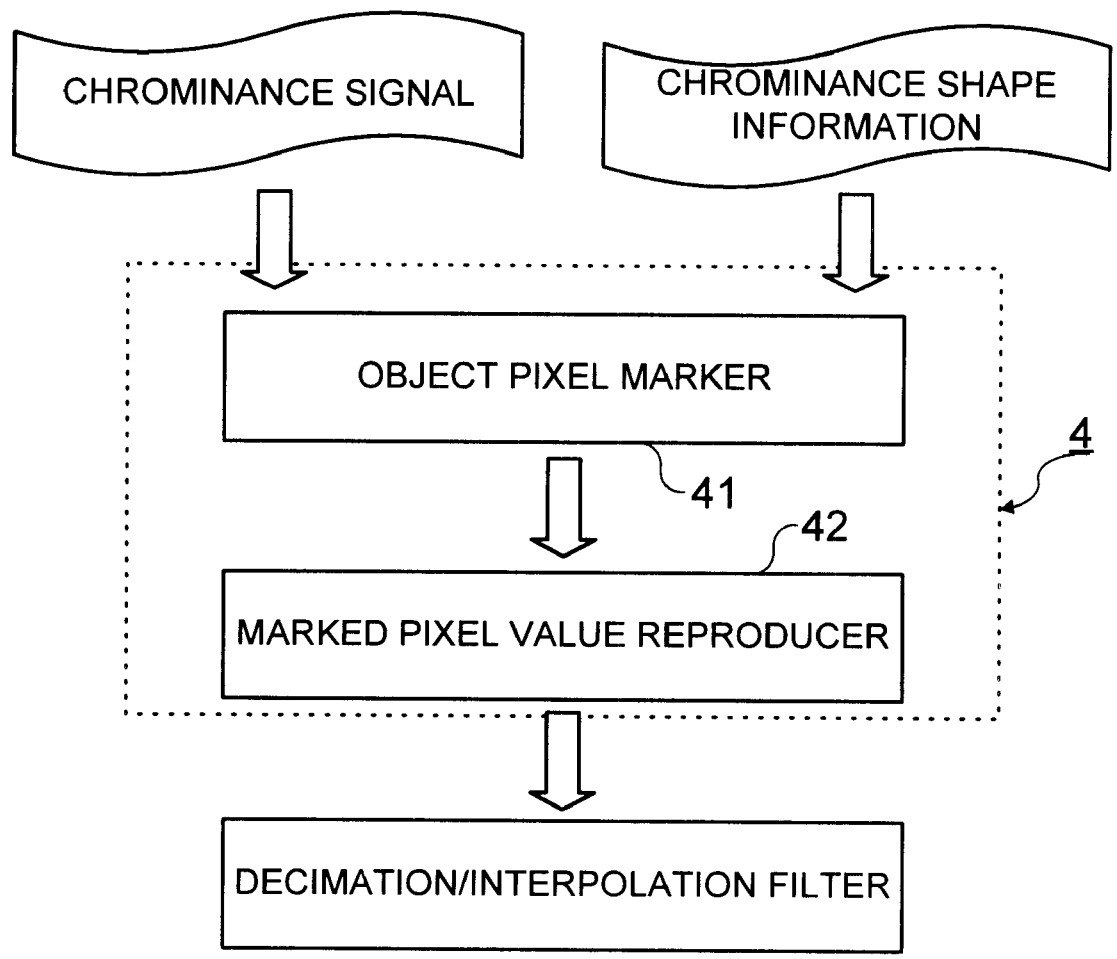
FIG. 6 is a block diagram illustrating an object chrominance pixel reproducer according to the present invention.

On the other hand, as shown in FIG. 6, the object chrominance pixel reproducer 4 of FIG. 3 includes an object chrominance pixel marker 41 for receiving chrominance signals along with chrominance shape information and marking object chrominance pixels having values to be removed, based on the received chrominance signals and chrominance shape information, and a marked-pixel value reproducer 42 for replacing the marked object chrominance pixel values with appropriate background chrominance pixel values, respectively.

Figure 7:
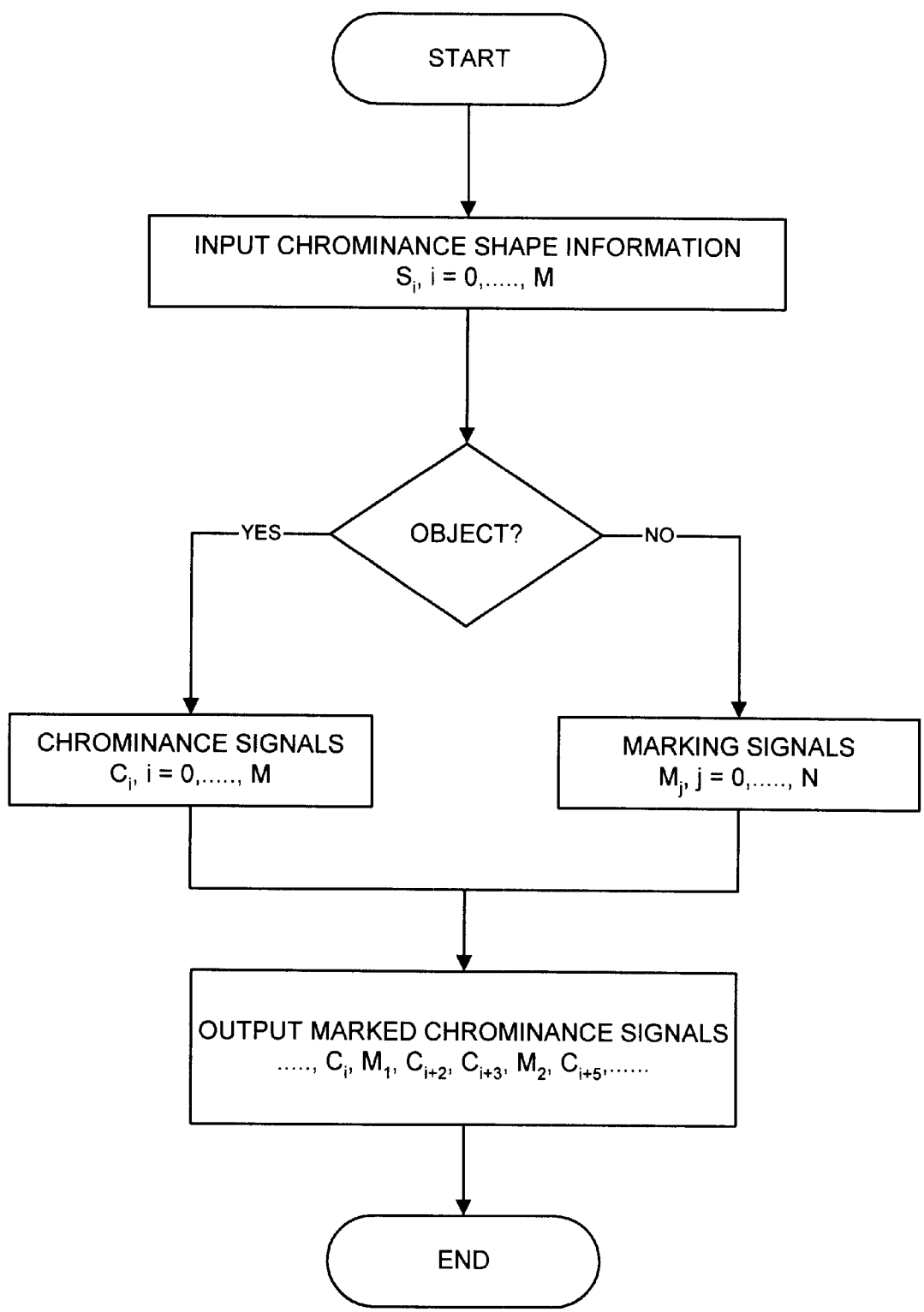
FIG. 7 is a flow chart illustrating a background chrominance pixel marking procedure according to the present invention.

In the background chrominance signal marking operation conducted in the background pixel reproducer 5 by the background pixel marker 51, inputting of chrominance shape information is first executed, as shown in FIG. 7. Thereafter, it is determined whether or not the pixel to be filtered is an object chrominance pixel, based on the input chrominance shape information. Where it is determined that the pixel to be filtered is an object chrominance pixel, input chrominance signals are used as they are. On the other hand, where it is determined that the pixel to be filtered is not an object chrominance pixel, but a background chrominance pixel, the input chrominance signals are marked so that appropriate object values are reproduced for those marked chrominance signals, respectively. Thus, marked chrominance signals are output.

Figure 8:
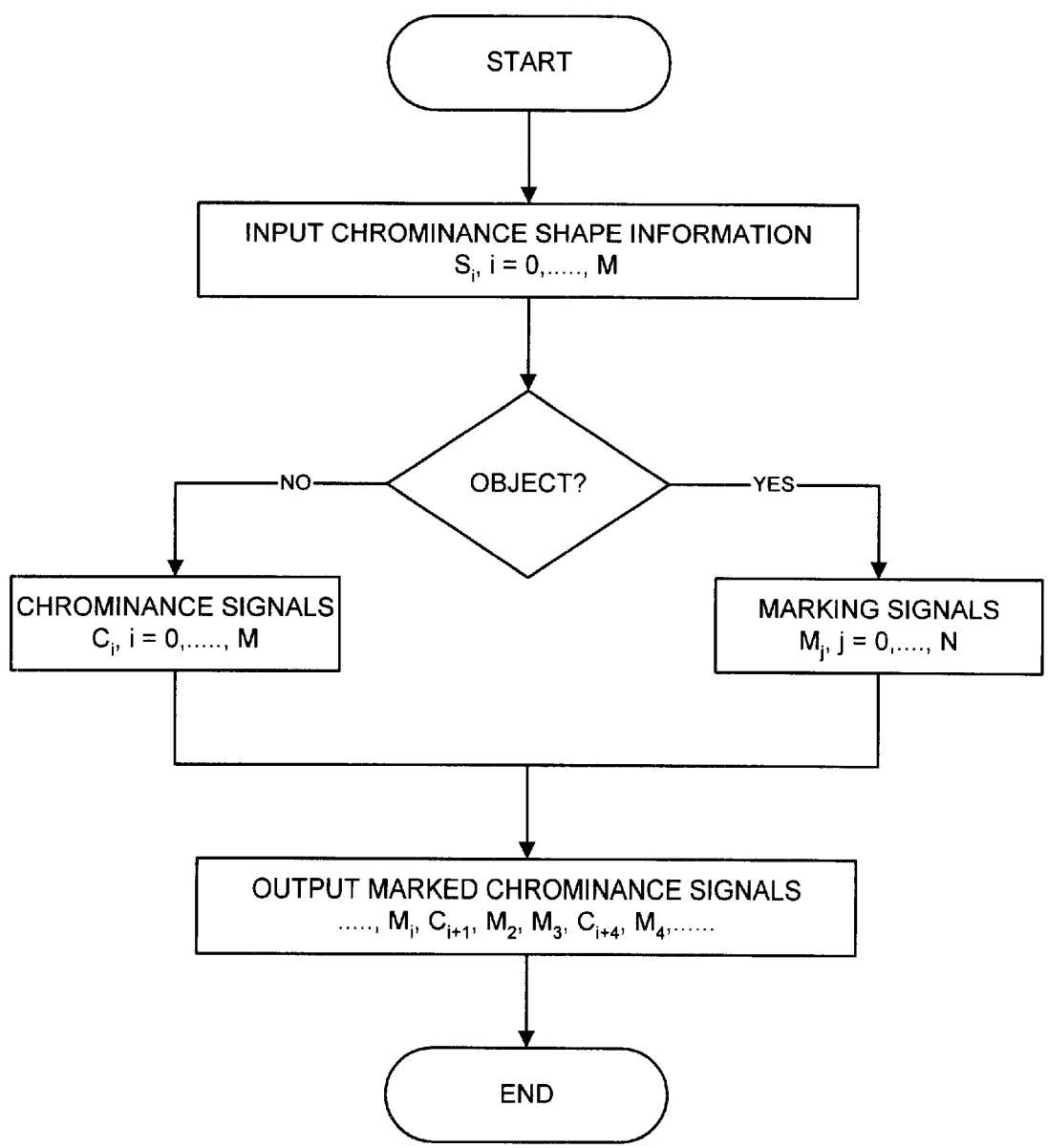
FIG. 8 is a flow chart illustrating an object chrominance pixel marking procedure according to the present invention.

Meanwhile, in the object chrominance signal marking operation conducted in the background pixel reproducer 4 by the object pixel marker 41, inputting of chrominance shape information is first executed, as shown in FIG. 8. Thereafter, it is determined whether or not the pixel to be filtered is an object chrominance pixel, based on the input chrominance shape information. Where it is determined that the pixel to be filtered is a background chrominance pixel, input chrominance signals are used as they are. On the other hand, where it is determined that the pixel to be filtered is not a background chrominance pixel, but an object chrominance pixel, the input chrominance signals are marked so that they are replaced with new values, respectively. Thus, marked chrominance signals are output.

Each of the marked-pixel value reproducers 42 and 52 of FIGS. 6 and 7 receives a series of signals containing marked signals and then reproduces arbitrary values determined by the user for marked pixels, respectively. The value to be reproduced for each marked pixel may be the average of pixel values not marked or the value of a pixel not marked and spatially nearest the marked pixel. The reproduction method is not limited to the above mentioned method. Pixel values reproduced as mentioned above are then filtered using a well-known decimation/interpolation filter.

Figure 9:
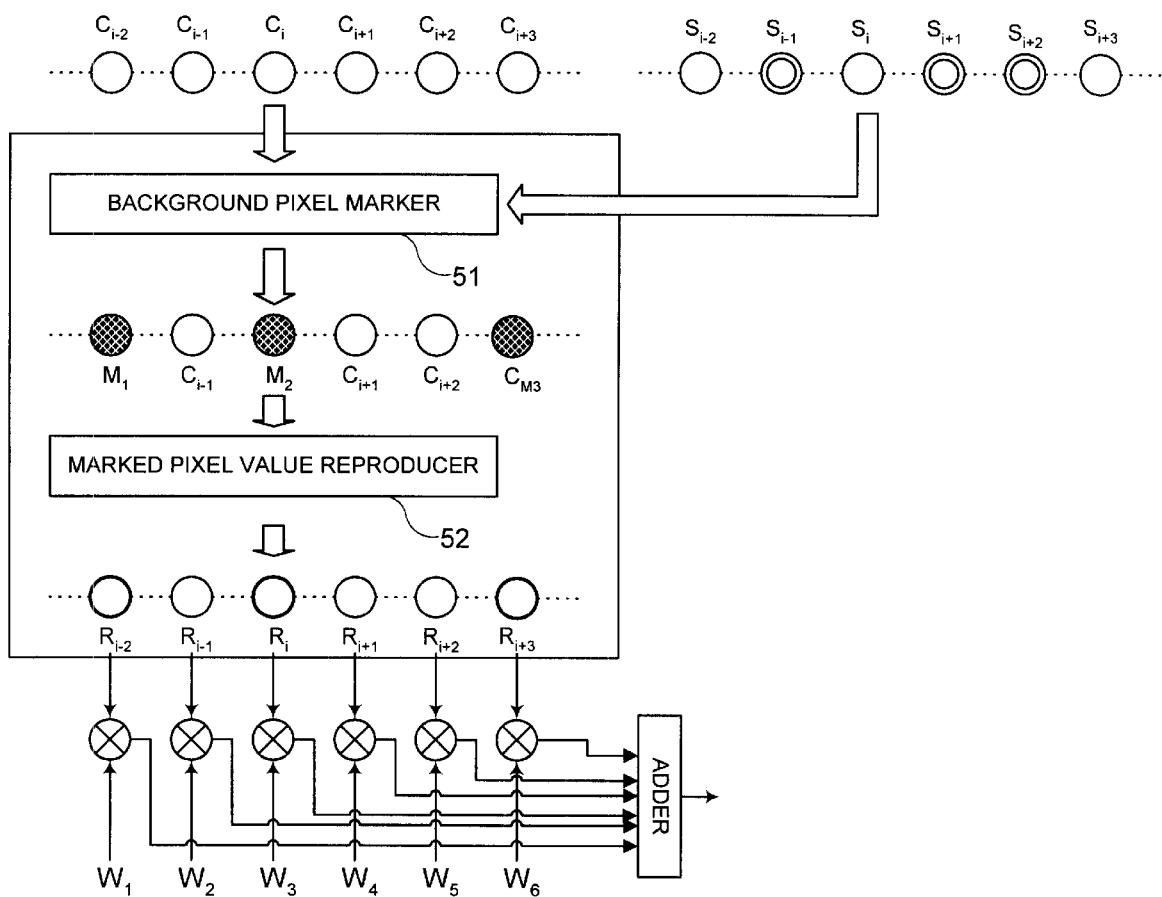
FIG. 9 is a block diagram illustrating a background chrominance pixel reproducing procedure carried out using a 6-tap filter in accordance with the present invention.

The background pixel marking procedure and marked-pixel value reproducing procedure carried out in the background chrominance pixel reproducer 5 will now be described in detail, in conjunction with the case of FIG. 9 using a 6-tap filter. When the background chrominance pixel marker 51 receives chrominance signals $C_{i-2}$, $C_{i-1}$, $C_i$, $C_{i+1}$, $C_{i+2}$, and $C_{i+3}$, to be filtered, along with chrominance shape information $S_{i-2}$, $S_{i-1}$, $S_i$, $S_{i+1}$, $S_{i+2}$, and $S_{1+3}$ containing information for sorting background and object chrominance pixels from each other, it conducts a marking operation for the received chrominance signals, based on the received chrominance shape information, in order to remove values of background chrominance pixels while keeping values of object chrominance pixels. In accordance with this marking operation, signals $M_1$, $C_{i-1}$, $M_2$, $C_{i+1}$, $C_{1+2}$, and $M_3$ are output from the background chrominance pixel marker 51. In FIG. 9 and other figures, "○" represents shape information associated with the background whereas "◉" represents shape information associated with the object. The signals $M_1$, $C_{i-1}$, $M_2$, $C_{i+1}$, $C_{i+2}$, and $M_3$ output from the background chrominance pixel marker 51 are applied to the marked-pixel value reproducer 52 which, in turn, find marked pixels, based on the received signals. The marked-pixel value reproducer 52 allocates new values to the found marked pixels. Thus, signals $R_{i-2}$, $R_{i-1}$, $R_i$, $RR_{i+1}$, $R_{i+2}$, and $R_{i+3}$ are output from the marked-pixel value reproducer 52. The signals $R_{i-1}$, $R_{i+2}$, and $R_{i+2}$ have values duplicated from the values of the signals $C_{i-1}$, $C_{i+1}$, and $C_{i+2}$ whereas the signals $R_{i-2}$, $R_i$, and $R_{i+3}$ have values newly allocated by the marked-pixel value reproducer 52. The signals $R_{i-2}$, $R_{1-1}$, $R_i$, $Ri_{30\ 1}$, $R_{i+2}$, and $R_{i+3}$ output from the marked-pixel value reproducer 52, which are reproduced chrominance signal values, are filtered by a well-known filter.

Figure 10:
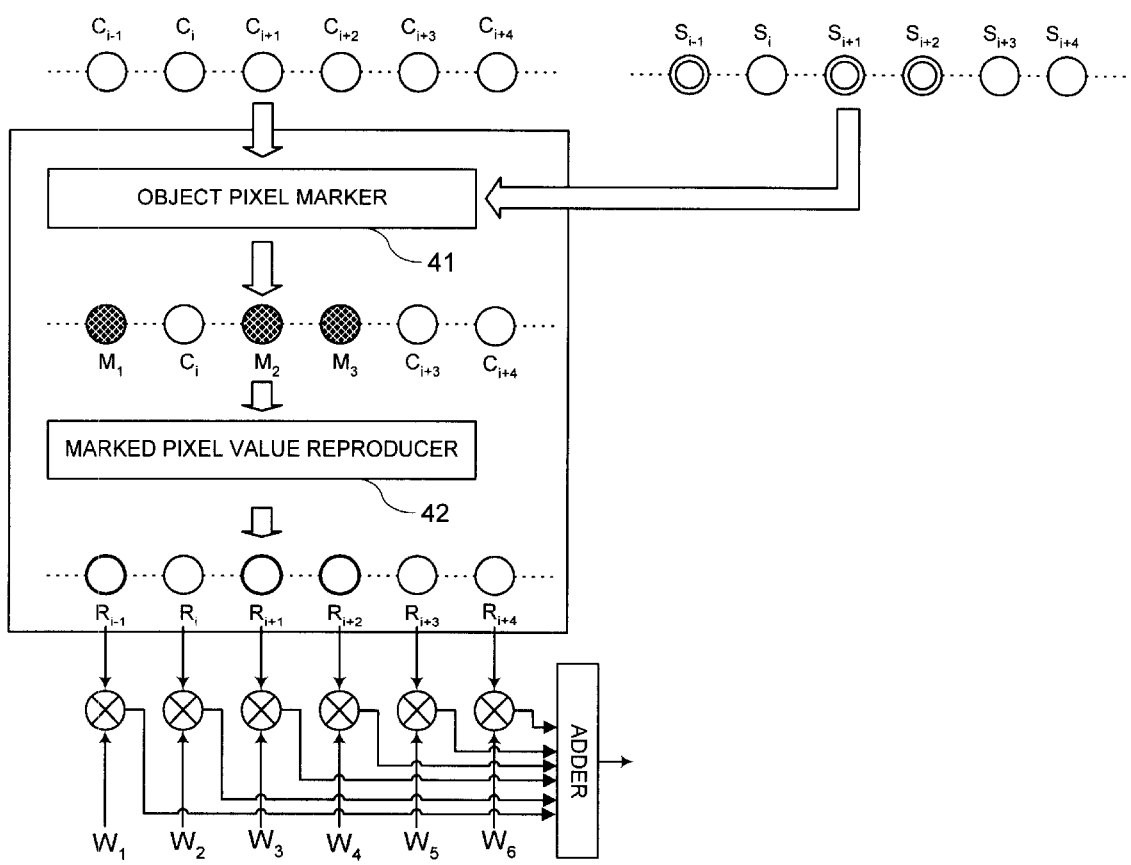
FIG. 10 is a block diagram illustrating an object chrominance pixel reproducing procedure carried out using a 6-tap filter in accordance with the present invention.

On the other hand, the object pixel marking procedure and marked-pixel value reproducing procedure carried out in the object chrominance pixel reproducer 4 will now be described in detail, in conjunction with the case of FIG. 10 using a 6-tap filter. When the object chrominance pixel marker 41 receives chrominance signals $C_{i-1}$, $C_i$, $C_{i+1}$, $C_{i+2}$, $C_{i+3}$, and $C_{i+4}$ to be filtered, along with chrominance shape information $S_{i-1}$, $S_i$, $S_{i+1}$, $S_{i+2}$, $S_{i+3}$, $S_{i+4}$, it conducts a marking operation for the received chrominance signals, based on the received chrominance shape information, in order to remove values of object chrominance pixels while keeping values of background chrominance pixels. In accordance with this marking operation, signals $M_1$, $C_i$, $M_2$, $M_3$, $C_{i+3}$, and $C_{i+4}$ are output from the object chrominance pixel marker 41. The signals $M_1$, $C_i$, $M_2$, $M_3$, $C_{i+3}$, and $C_{i+4}$ output from the object chrominance pixel marker 41 are applied to the marked-pixel value reproducer 42 which, in turn, find marked pixels, based on the received signals. The marked-pixel value reproducer 42 allocates new values to the found marked pixels. Thus, signals $R_{i-1}$, $R_i$, $R_{i+1}$, $R_{i+2}$, $R_{i+3}$ and $R_{i+4}$ are output from the marked-pixel value reproducer 42. The signals $R_i$, $R_{i+3}$, and $R_{i+4}$ have values duplicated from the values of the signals $C_i$, $C_{i+3}$, and $C_{i+4}$ whereas the signals $R_{i-1}$, $R_{i+1}$, and $R_{i+2}$ have values newly allocated by the marked-pixel value reproducer 42. The signals $R_{i-1}$, $R_i$, $R_{i+1}$, $R_{i+2}$, $R_{i+3}$ and $R_{i+4}$ output from the marked-pixel value reproducer 42, which are reproduced chrominance signal values, are filtered by a well-known filter.

In accordance with the present invention, where the source chrominance signals applied to the filter taps in a decimation filtering process are those all being associated with the object or all being associated with the background, they are filtered in the same manner as in the conventional decimation filtering process.

Generally, in a video interpolation filtering process, no interpolation filtering is conducted for background chrominance signals. In place, a predetermined background value is allocated. This is because a video signals associated with the background in a frame are not considered to be important in applications involving object-based video coding, decoding, manipulating, and processing. However, where it is desired to conduct an interpolation filtering for background chrominance signals, the interpolation filtering may be carried out in the same manner as that for object chrominance signals.

Hereinafter, the present invention will be described in more detail, in conjunction with various embodiments concerned with a reproduction method for marked pixel values, namely, marked chroma samples. These embodiments of the invention are made only for illustrative purposes, and those skilled in the art will appreciate that various modifications, additions and substitutions are possible, without departing from the scope and spirit of the invention. Accordingly, the present invention is not to be construed as being limited to those embodiments. For the convenience of description, the following description will be made in conjunction with the case in which the number of filter taps used is 6.

Embodiment 1

Figure 11:
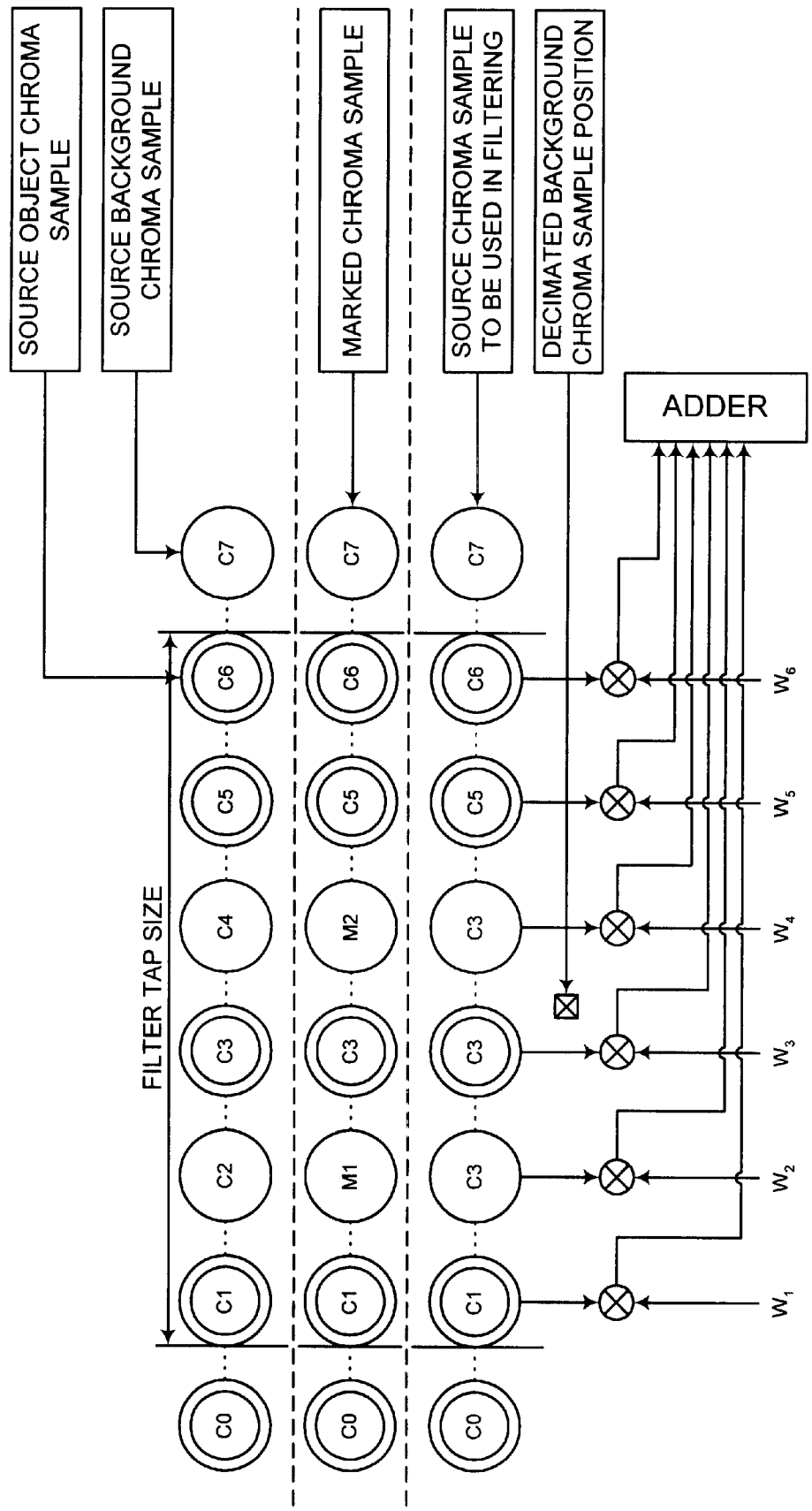
FIG. 11 is a block diagram illustrating a decimation filtering method for object chroma samples in accordance with a first embodiment of the present invention.
Figure 12:
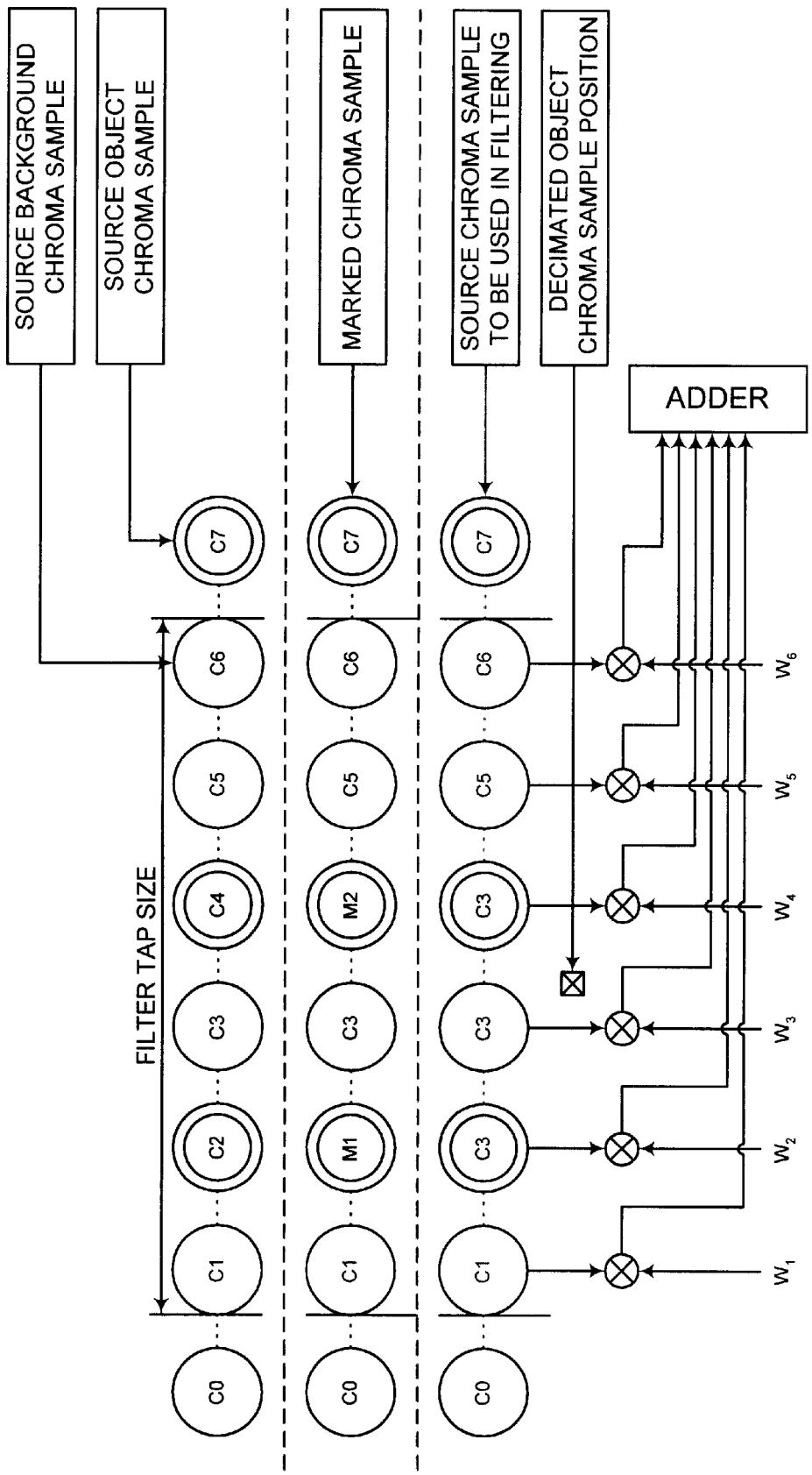
FIG. 12 is a block diagram illustrating a decimation filtering method for background chroma samples in accordance with the first embodiment of the present invention.

FIGS. 11 and 12 illustrate a first embodiment of the present invention. This embodiment is concerned with a decimation filtering method for producing decimated object chroma samples and decimated background chroma samples.

In accordance with this embodiment, where the number of source object chroma samples is a positive integer less than the number of filter taps, namely, the filter tap size, all source background chroma samples existing in the filter taps are marked when it is desired to produce decimated object chroma samples. That is, source background chroma samples C2 and C4 are marked, thereby generating marked source background chroma samples M1 and M2, as shown in FIG. 11. For these marked source background chroma samples M1 and M2, source object chroma samples spatially nearest those marked samples M1 and M2 are reproduced, respectively. The reproduced object chroma samples are used in the filtering process, in pace of the source background chroma samples C2 and C4. If there are two or more source object chroma samples spaced by the same distance from each marked source background chroma sample, as in the case of FIG. 11, the source object chroma sample nearest a decimated object chroma sample position is then reproduced. In the case of FIG. 11, the source object chroma sample C3 is reproduced.

When it is desired to produce decimated background chroma samples in accordance with this embodiment, if the number of source background chroma samples is a positive integer less than the number of filter taps, namely, the filter tap size, all source object chroma samples existing in the filter taps are then marked. That is, source object chroma samples C2 and C4 are marked, thereby generating marked source background chroma samples M1 and M2, as shown in FIG. 12. For these marked source object chroma samples M1 and M2, source background chroma samples spatially nearest those marked samples M1 and M2 are reproduced, respectively. The reproduced background chroma samples are used in the filtering process, in pace of the source object chroma samples C2 and C4. If there are two or more source background chroma samples spaced by the same distance from each decimated background chroma sample, as in the case of FIG. 12, the source background chroma sample nearest a decimated background chroma sample position is then reproduced. In the case of FIG. 12, the source background chroma sample C3 is reproduced.

Embodiment 2

Figure 13:
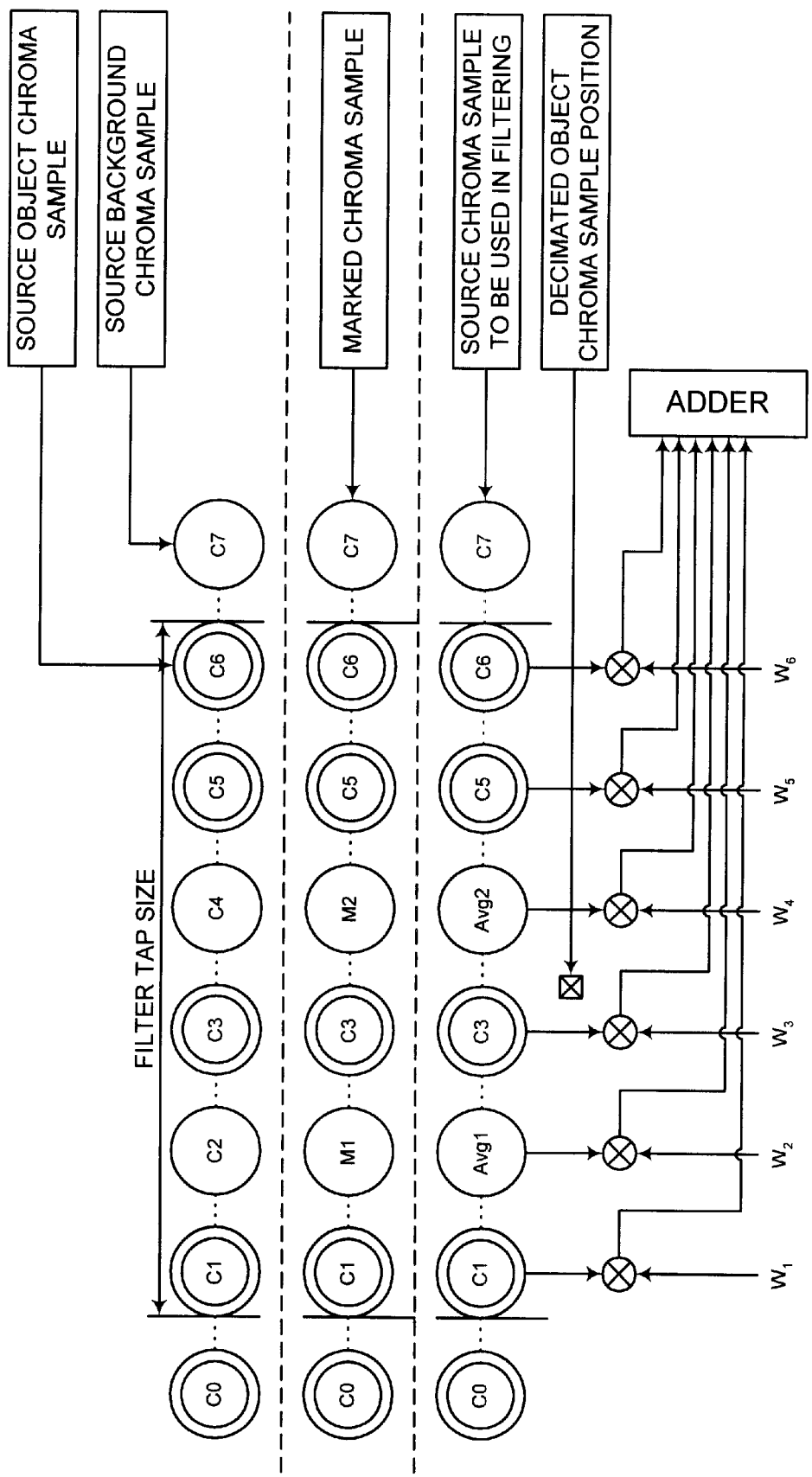
FIG. 13 is a block diagram illustrating a decimation filtering method for object chroma samples in accordance with a second embodiment of the present invention.
Figure 14:
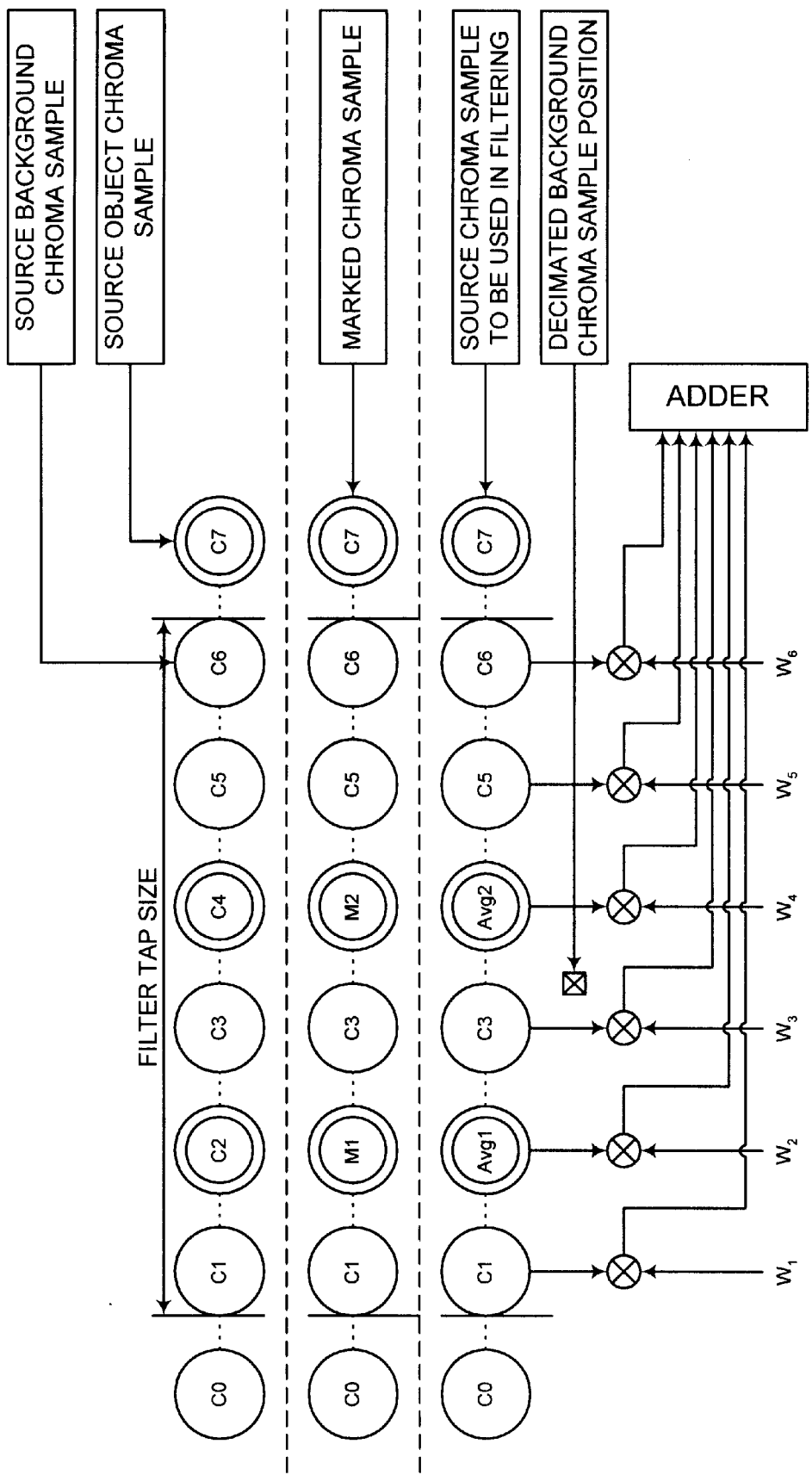
FIG. 14 is a block diagram illustrating a decimation filtering method for background chroma samples in accordance with the second embodiment of the present invention.

FIGS. 13 and 14 illustrate a second embodiment of the present invention. This embodiment is concerned with a decimation filtering method for producing decimated object chroma samples and decimated background chroma samples.

In accordance with this embodiment, when it is desired to produce decimated object chroma samples in accordance with this embodiment, if the number of source object chroma samples is a positive integer less than the number of filter taps, namely, the filter tap size, all source background chroma samples existing in the filter taps are then marked. That is, source background chroma samples C2 and C4 are marked, thereby generating marked source background chroma samples M1 and M2, as shown in FIG. 13. For these marked source background chroma samples M1 and M2, two source object chroma samples spatially nearest each of the marked samples M1 and M2 are reproduced, respectively. Average values Avg1 and Avg2 of the reproduced object chroma samples for respective source background chroma samples are used in the filtering process (Avg1= (C1+C3)/2); and Avg2=(C3+C5)/2). If there is only one source object chroma sample, the value of this source object chroma sample is then used in the filtering process in place of the source background chroma signals.

When it is desired to produce decimated background chroma samples in accordance with this embodiment, if the number of source background chroma samples is a positive integer less than the number of filter taps, namely, the filter tap size, two source background chroma samples spatially nearest each of all source object chroma samples existing in the filter taps are reproduced for the source object chroma sample associated therewith. Average values Avg1 and Avg2 of the reproduced background chroma samples for respective source object chroma samples are used in the filtering process (Avg1=(C1+C3)/2); and Avg2=(C3+C5)/2). If there is only one source background chroma sample, the value of this source background chroma sample is then used in the filtering process in place of the source object chroma signals.

Embodiment 3

Figure 15:
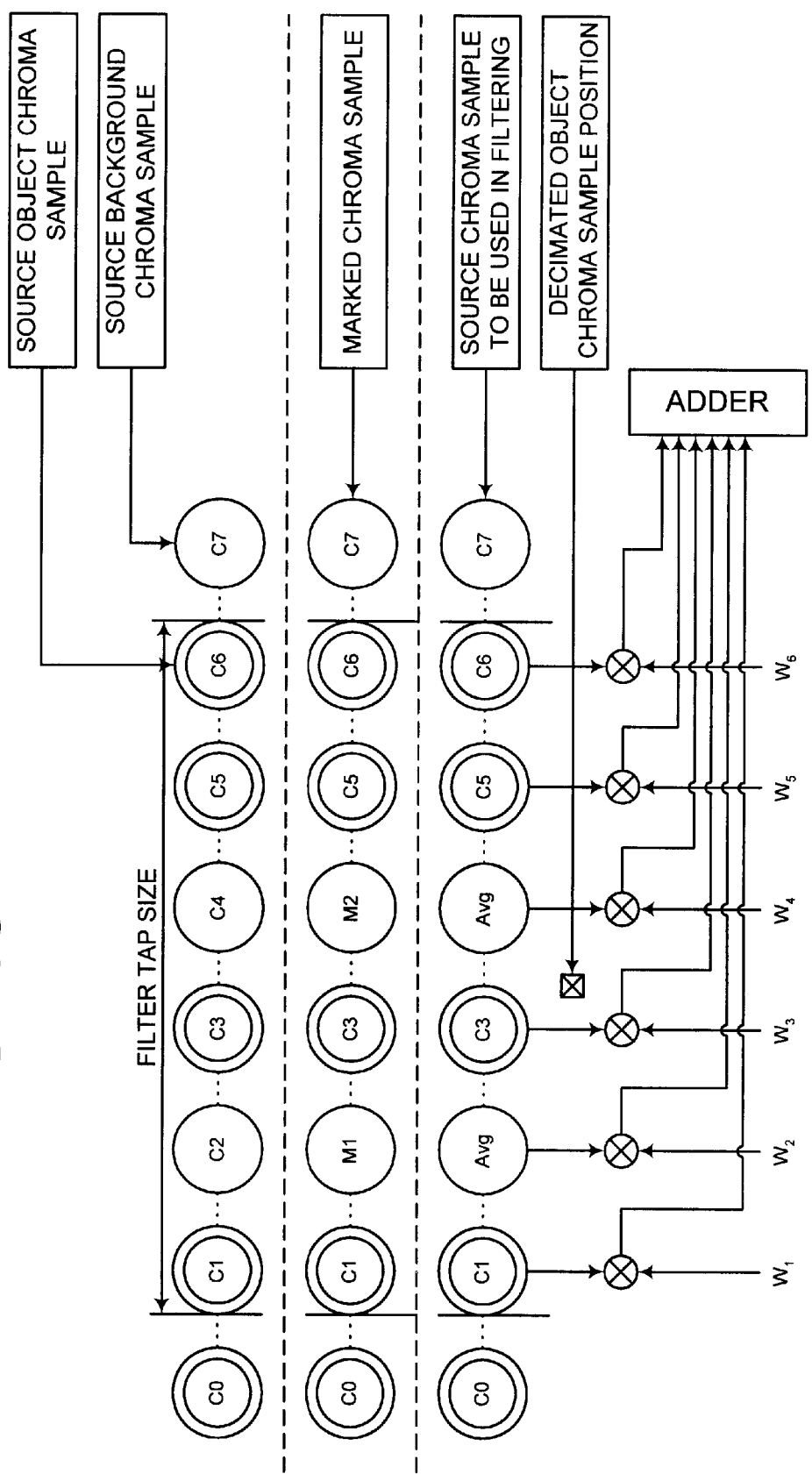
FIG. 15 is a block diagram illustrating a decimation filtering method for object chroma samples in accordance with a third embodiment of the present invention.
Figure 16:
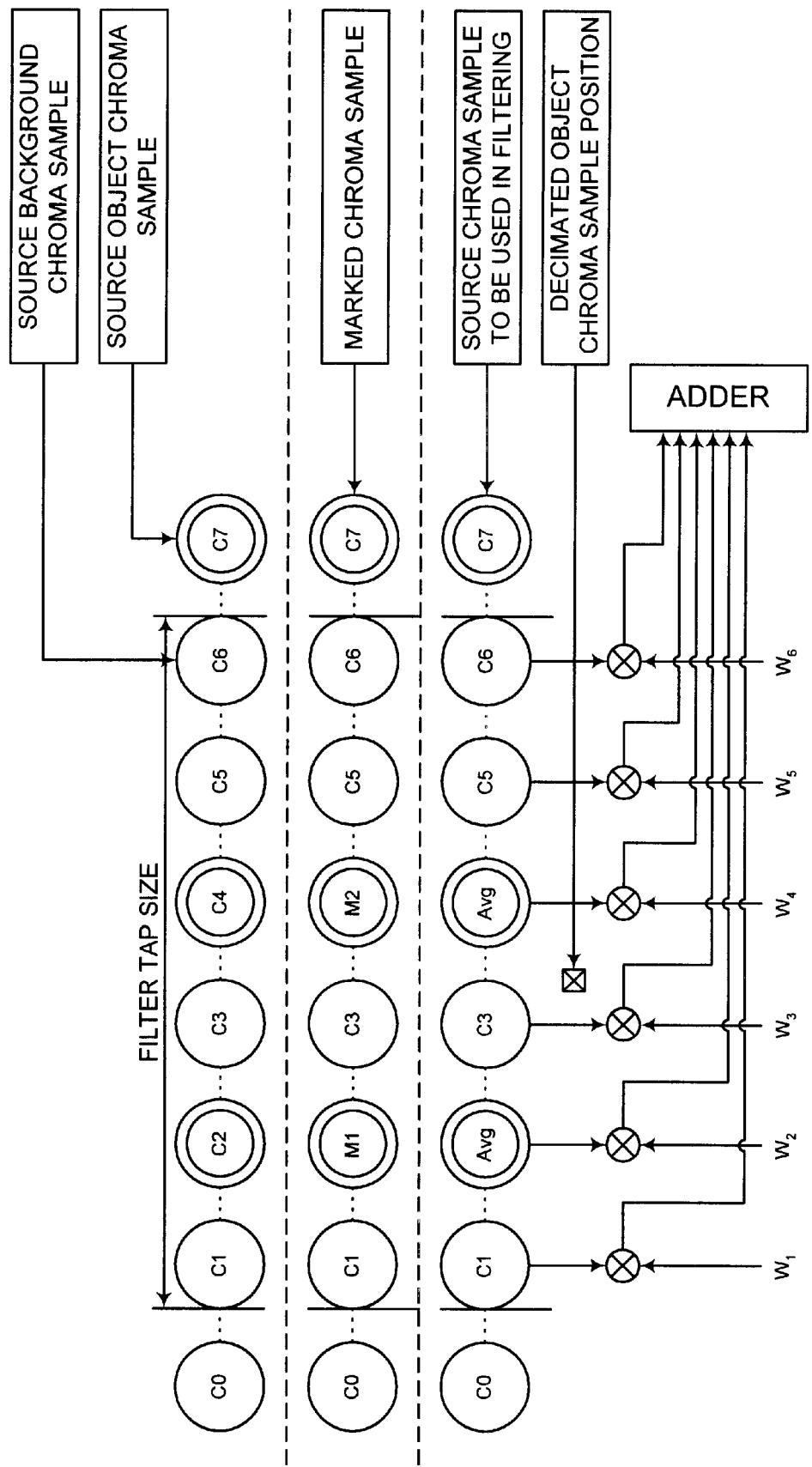
FIG. 16 is a block diagram illustrating a decimation filtering method for background chroma samples in accordance with the third embodiment of the present invention.

FIGS. 15 and 16 illustrate a third embodiment of the present invention. This embodiment is concerned with a decimation filtering method for producing decimated object chroma samples and decimated background chroma samples.

In accordance with this embodiment, where the number of source object chroma samples is a positive integer less than the number of filter taps, namely, the filter tap size, upon decimation-filtering object information, all source background chroma samples existing in the filter taps are replaced with an average value of all source object chroma samples existing in the filter taps, so that object chroma samples, to be filtered, are reproduced for those source background chroma samples, respectively. On the other hand, where the number of source background chroma samples is a positive integer less than the number of filter taps, namely, the filter tap size, upon decimation-filtering background information, all source object chroma samples existing in the filter taps are replaced with an average value of all source background chroma samples existing in the filter taps, so that background chroma samples, to be filtered, are reproduced for those source object chroma samples, respectively.

That is, in a decimation filtering process applied to a down conversion, where the number of source object chroma samples is a positive integer less than the number of filter taps, namely, the filter tap size, all source background chroma samples existing in the filter taps are marked. In the case of FIG. 15, accordingly, marked source background chroma samples M1 and M2 are generated. In place of these marked source background chroma samples M1 and M2, an average value Avg of all source object chroma samples existing in the filter taps is used in the filtering process (Avg=(C1+C3+C5+C6/4).

When it is desired to produce decimated background chroma samples in the case of FIG. 16, if the number of source background chroma samples is a positive integer less than the number of filter taps, namely, the filter tap size, all source object chroma samples existing in the filter taps are marked. In the case of FIG. 16, accordingly, marked source object chroma samples M1 and M2 are generated for source object chroma samples C2 and C4. In place of the source object chroma samples C2 and C4, an average value Avg of all source background chroma samples existing in the filter taps is used in the filtering process (Avg=(C1+C3+C5+C6/4).

Embodiment 4

Figure 17:
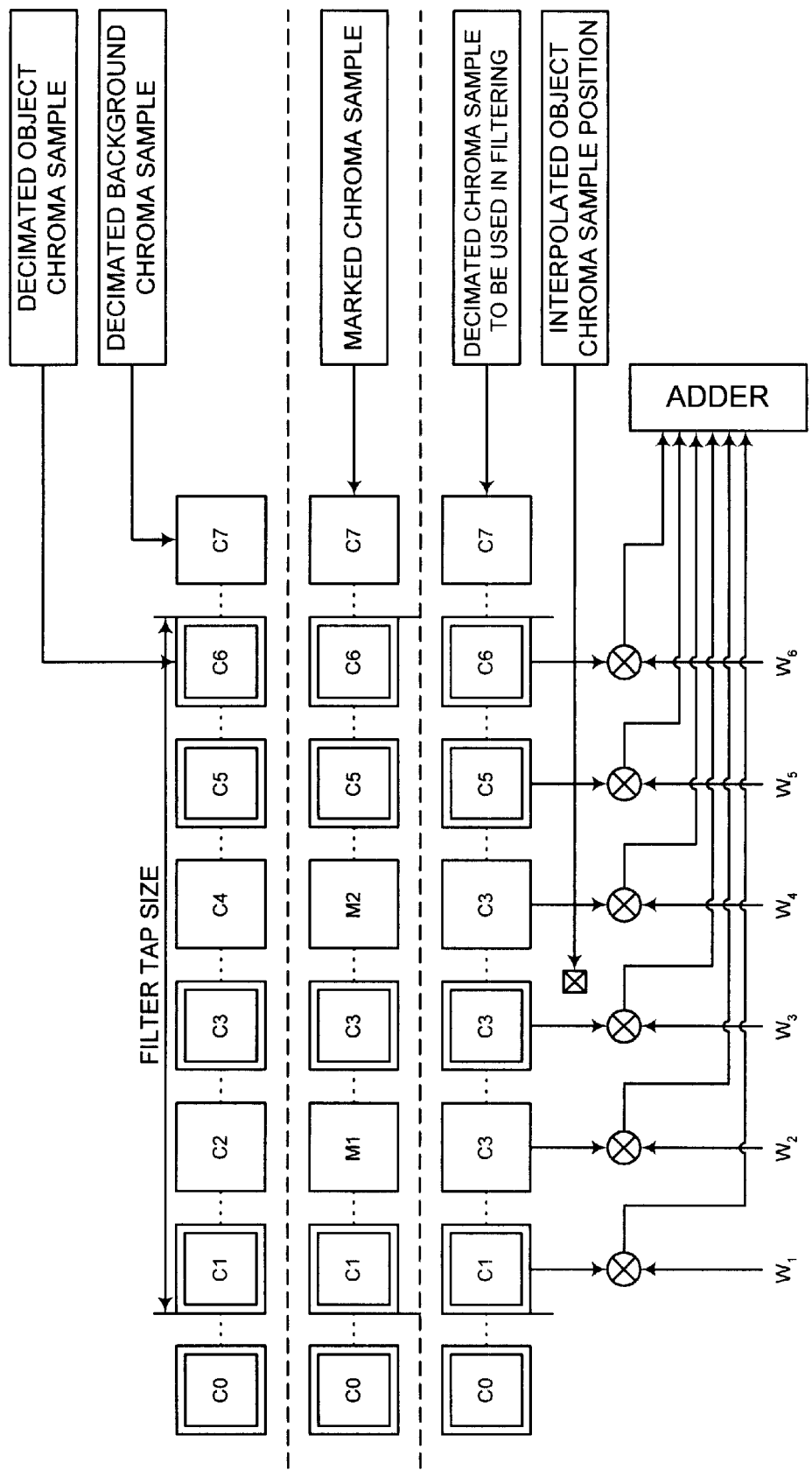
FIG. 17 is a block diagram illustrating an interpolation filtering method for object chroma samples in accordance with an embodiment of the present invention.

FIG. 17 illustrates a fourth embodiment of the present invention. This embodiment is concerned with an interpolation filtering method for chrominance signals of an image.

In accordance with this embodiment, upon interpolation-filtering object information, where the number of decimated object chroma samples existing in taps in an interpolation filer is a positive integer less than the number of the filter taps, decimated object chroma signals spatially nearest all decimated background chroma samples existing in the filter taps are reproduced for those decimated background chroma samples. That is, the reproduced object chroma samples are interpolation-filtered, in pace of the decimated background chroma samples, respectively.

That is, where it is desired to produce interpolated object chroma samples in an interpolation filtering process applied to an up conversion, if the number of decimated object chroma samples is a positive integer less than the number of taps in an interpolation filter, all decimated background chroma samples existing in the filter taps are marked. That is, decimated background chroma samples C2 and C4 are marked, as shown in FIG. 17. Accordingly, marked source background chroma samples M1 and M2 are generated. In place of these marked source background chroma samples M1 and M2, decimated object chroma signals spatially nearest all decimated background chroma samples existing in the filter taps are reproduced for those decimated background chroma samples, respectively. The reproduced object chroma samples are interpolation-filtered, in pace of the decimated background chroma samples. If the number of decimated object chroma sample spaced by the same distance from each marked source background chroma sample is only one, the source object chroma sample nearest a decimated object chroma sample position is then reproduced. In the case of FIG. 17, the decimated object chroma sample C3 is reproduced.

Embodiment 5

Figure 18:
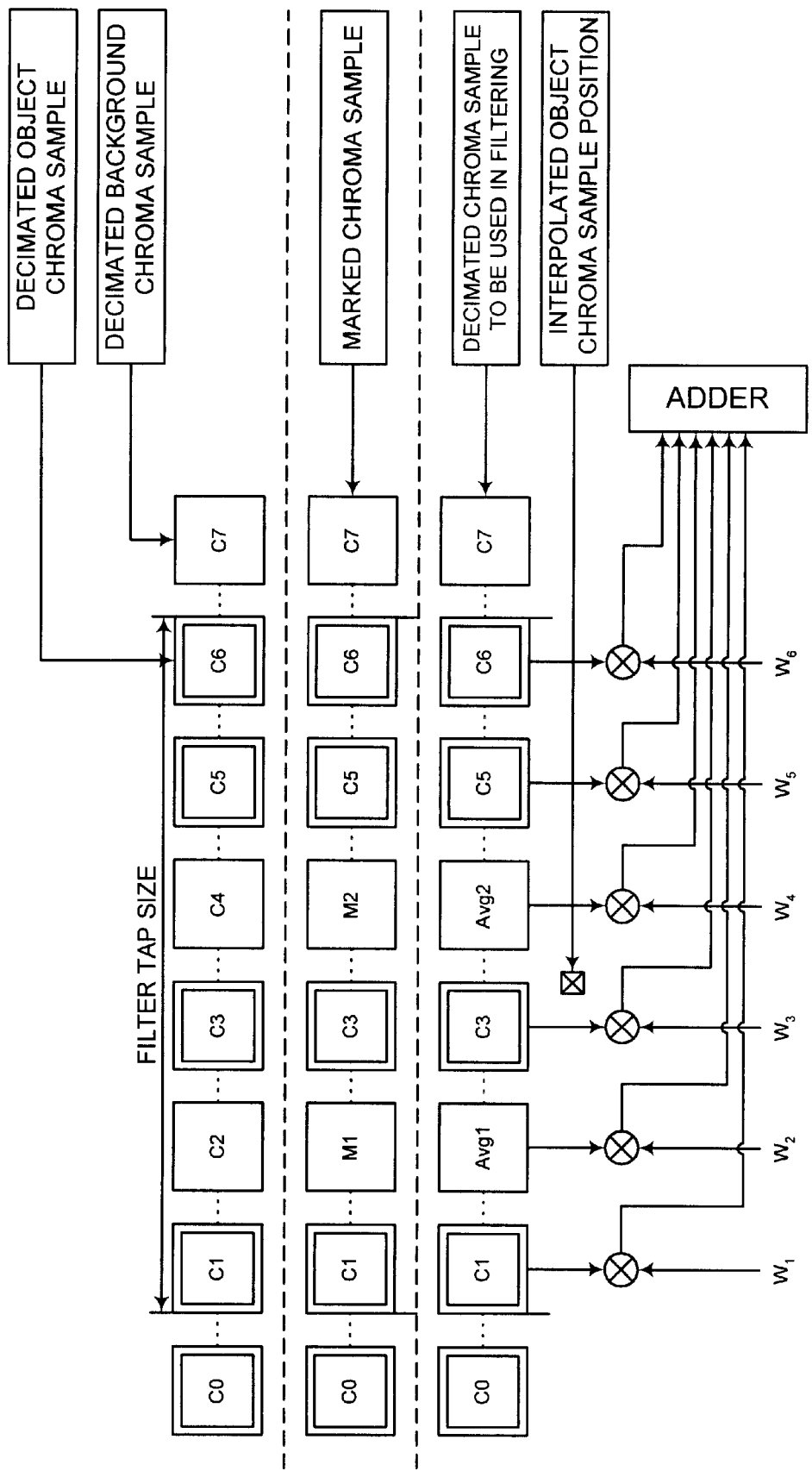
FIG. 18 is a block diagram illustrating an interpolation filtering method for object chroma samples in accordance with another embodiment of the present invention.

FIG. 18 illustrates a fifth embodiment of the present invention. This embodiment is concerned with an interpolation filtering method for chrominance signals of an image.

In accordance with this embodiment, upon interpolation-filtering object information, where the number of decimated object chroma samples existing in taps in an interpolation filer is a positive integer less than the number of the filter taps, an average value of two decimated object chroma signals spatially nearest all decimated background chroma samples existing in the filter taps are reproduced for those decimated background chroma samples. That is, the interpolation filtering is carried out using the reproduced average value, in pace of the decimated background chroma samples.

That is, where it is desired to produce interpolated object chroma samples in an interpolation filtering process applied to an up conversion, if the number of decimated object chroma samples is a positive integer less than the number of taps in an interpolation filter, all decimated background chroma samples existing in the filter taps are marked. That is, decimated background chroma samples C2 and C4 are marked, as shown in FIG. 18. Accordingly, marked source background chroma samples M1 and M2 are generated. For these marked source background chroma samples M1 and M2, two decimated object chroma samples spatially nearest each of all background chroma samples existing in the filter taps are reproduced for the decimated background chroma sample associated therewith. Average values Avg1 and Avg2 of the reproduced object chroma samples for respective decimated background chroma samples are used in the filtering process (Avg1=(C1+C3)/2); and Avg2=(C3+C5)/2). If there is only one decimated object chroma sample, the value of this decimated object chroma sample is used in the filtering process in place of the decimated background chroma signals.

Embodiment 6

Figure 19:
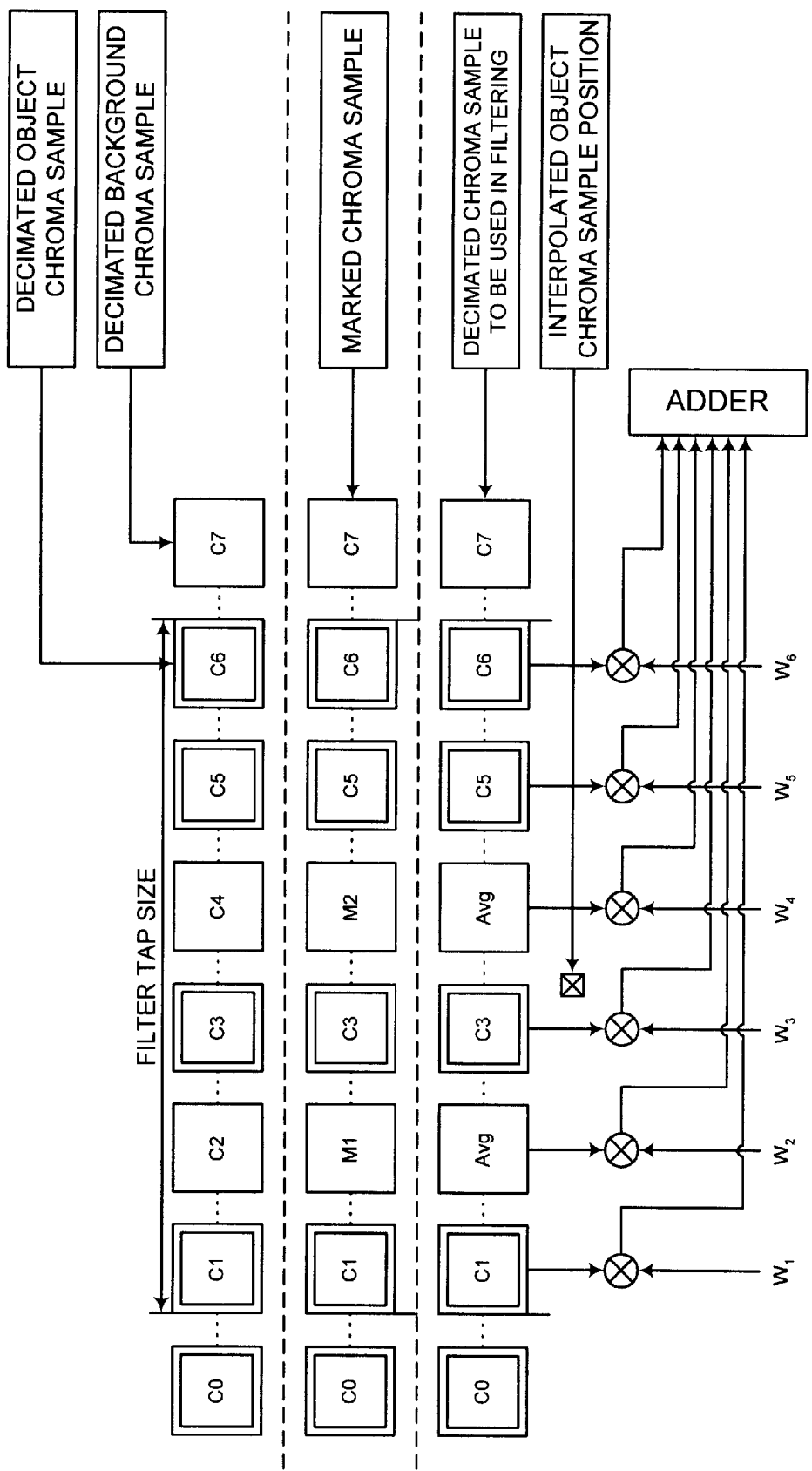
FIG. 19 is a block diagram illustrating an interpolation filtering method for object chroma samples in accordance with another embodiment of the present invention.

FIG. 19 illustrates a sixth embodiment of the present invention. This embodiment is concerned with an interpolation filtering method for chrominance signals of an image.

In accordance with this embodiment, upon interpolation-filtering object information, where the number of decimated object chroma samples existing in taps in an interpolation filer is a positive integer less than the number of the filter taps, all decimated background chroma samples existing in the filter taps are replaced with an average value of all decimated object chroma signals existing in the filter taps, so that object chroma samples, to be filtered, are reproduced for those decimated background chroma samples, respectively. Thus, the interpolation filtering is carried out using the reproduced average value, in pace of the decimated background chroma samples.

That is, where it is desired to produce interpolated object chroma samples in an interpolation filtering process applied to an up conversion, if the number of decimated object chroma samples is a positive integer less than the number of taps in an interpolation filter, all decimated background chroma samples existing in the filter taps are marked. That is, decimated background chroma samples C2 and C4 are marked, as shown in FIG. 19. Accordingly, marked source background chroma samples M1 and M2 are generated. In place of these marked decimated background chroma samples M1 and M2, an average value Avg of all decimated object chroma samples existing in the filter taps is used in the filtering process (Avg=(C1+C3+C5+C6/4).

Although not shown, an interpolation filtering for background information may be carried out in the same manner as the interpolation filtering for object information. That is, where the number of decimated background chroma samples is a positive integer less than the number of filter taps, namely, the filter tap size, all decimated object chroma samples existing in the filter taps are marked. In place of these marked decimated object chroma samples, an average value of two decimated background chroma samples spatially nearest each of all decimated object chroma samples existing in the filter taps is used in the filtering process for the decimated object chroma sample associated therewith. Otherwise, an average value of all decimated background chroma samples existing in the filter taps is used in the filtering process for each decimated object chroma sample.

The image chrominance signal filtering method and apparatus of the present invention can be applied to image compressive coding and decoding schemes such as MPEG-4 involving an object-based processing. The method and apparatus of the present invention can also be applied to a content creation in which particular regions (objects) of an image, which are selected by the user, are extracted for their manipulation.

Now, an example of an object-based image signal coding and decoding system, to which the image chrominance signal filtering method is applied, will be described in conjunction with FIG. 20.

Figure 20:
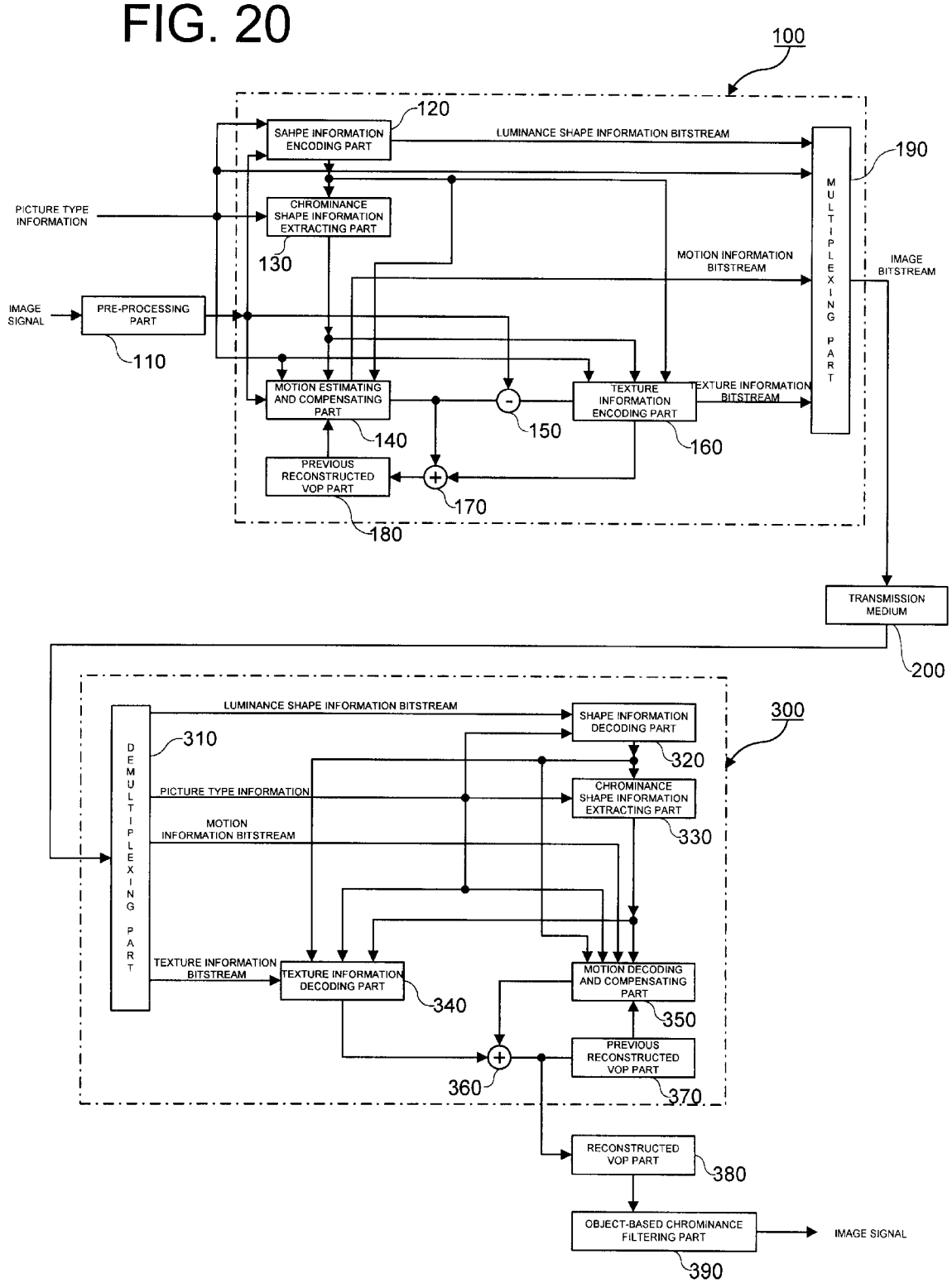
FIG. 20 is a block diagram illustrating an object-based image signal coding and decoding system to which the present invention is applicable.

Referring to FIG. 20, an object-based image signal coding and decoding system, to which the image chrominance signal filtering method is applied, is illustrated. As shown in FIG. 20, this system includes a coding unit 100, a transmission medium 200, and a decoding unit 300. The coding unit 100 includes a pre-processing part 110, a shape information encoding part 120, a chrominance shape information extracting part 130, a motion estimating and compensating part 140, a texture information encoding part 160, a subtractor 150, an adder 170, a previous reconstructed image object plane (VOP) part 180, and a multiplexing part 190. The decoding unit 300 includes a shape information decoding part 320, a chrominance shape information extracting part 330, a texture information decoding part 340, a motion compensating part 350, an adder 360, a previous reconstructed VOP part 370, a demultiplexing part 310, and an object-based chrominance signal filtering part 390.

Figure 21:
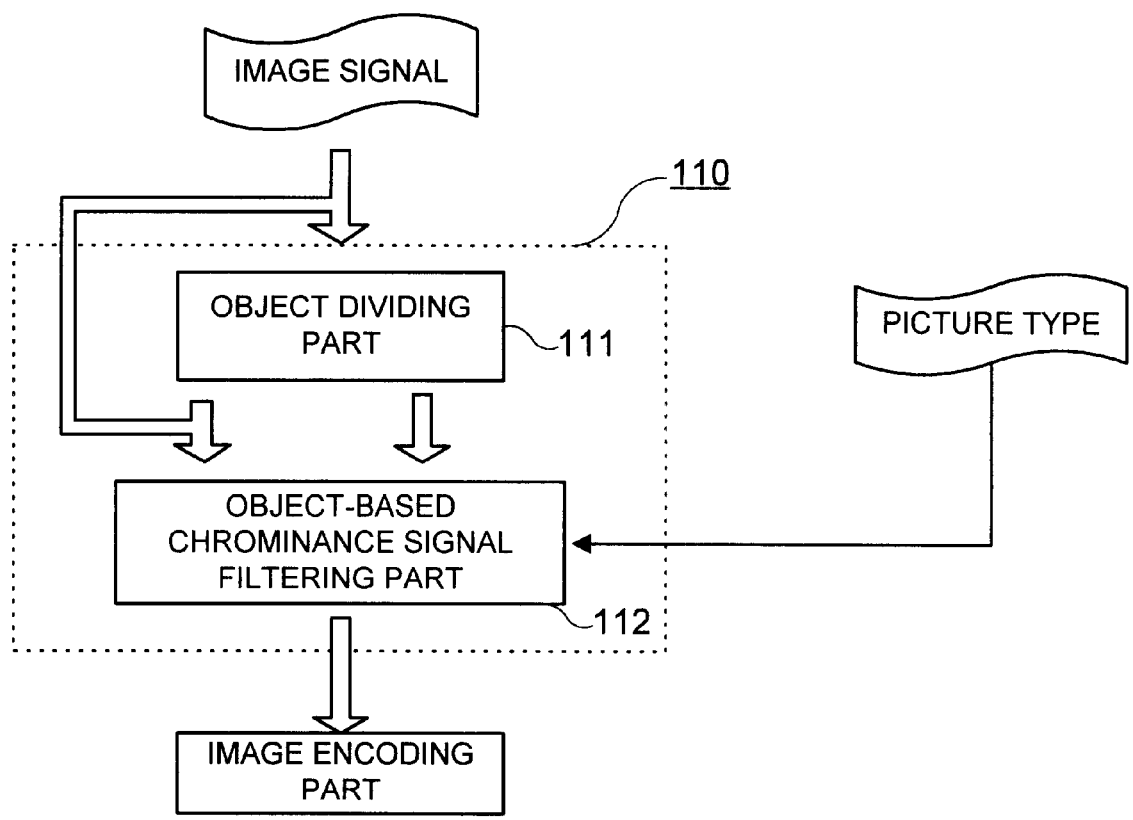
FIG. 21 is a block diagram illustrating a detailed configuration of a pre-processing part included in the system of FIG. 20.

In an object-based compressive coding operation of the above mentioned system for image signals, when a image signal is input, it is divided into a plurality of regions by the pre-processing part 110 which, in turn, outputs shape information about respective regions of the input image signal. The shape information is applied to the shape information encoding part 120 and motion information estimating part 140. As shown in FIG. 21, the pre-processing part 110 includes an object dividing part 111 for dividing the input image signal into a plurality of regions, and an object-based chrominance signal filtering part 112. In the object-based chrominance signal filtering part 112, the filtering of chrominance signals according to the present invention is conducted. In the shape information encoding part 120, object shape information is encoded. On the other hand, luminance shape information of the input image signal, which is reconstructed after being encoded, is applied from the shape information encoding part 120 to the chrominance shape information extracting part 130, motion estimating and compensating part 140, and texture information encoding part 160. The operations of the parts 130, 140 and 160 are carried out in an object-based manner. On the other hand, a luminance shape information bitstream, which is another output from the shape information encoding part 120, is applied to the multiplexing part 190.

In accordance with the present invention, the chrominance shape information extracting part 130 may be configured in such a fashion that it receives information about the picture type of the input image signal and conducts a conventional conservative chrominance shape sub-sampling process when the input image signal is a picture having a progressive frame structure while conducting a field-based chrominance shape sub-sampling process when the input image signal is a picture having an interlaced field structure.

The motion information estimating part 140 searches for the texture information about the current object based on the shape information received from the shape information encoding part 120 while searching for the motion information of the current object texture information based on the texture information about the previous object stored in the previous reconstructed VOP part 180 which is a previous reconstructed object memory. The motion information searched for is applied to the motion compensating part 140 for a motion compensated prediction. The estimated motion information is compressively encoded in the form of a motion information bitstream. This motion information bitstream is applied to the multiplexing part 190. The motion compensating part 140 conducts a motion compensated prediction using the previous reconstructed object texture information output from the previous reconstructed VOP part 180.

The subtractor 150 derives the difference between the input texture information and the texture information for motion compensated prediction, that is, a prediction error. This signal output from the subtractor 150 is then encoded in the texture information encoding part 160. A texture information bitstream output from the texture information encoding part 160 is sent to the multiplexing part 190. A reconstructed prediction error signal output from the texture information encoding part 160 is applied to the adder 170. In the adder 170, the reconstructed error signal is added to the motion estimated prediction signal, thereby producing a reconstructed texture information signal for the current object. This reconstructed texture information signal is stored in the previous reconstructed VOP part 180 so that it is subsequently used for an object subsequently input. The multiplexing unit 190 multiplexes the luminance shape information bitstream output from the shape information encoding part 120, the motion information bitstream output from the motion estimating and compensating part 140, and the texture information bitstream output from the texture information encoding unit 16, thereby outputting an image bitstream. This image bitstream is transmitted to the transmission medium 200.

The image bitstream is then input to the decoding unit 300 via the transmission medium 200. This image bitstream is then divided into a motion information bitstream, a luminance shape information bit stream, a texture information bitstream, and a picture type information bitstream while passing though the demultiplexing part 310 of the decoding unit 300. The shape information decoding part 320 receives the luminance shape information bitstream, thereby outputting reconstructed shape information. This reconstructed shape information is then applied to the chrominance shape information extracting part 330, motion decoding and compensating part 350, and texture information decoding part 340. Accordingly, The operations of the parts 330, 350 and 340 are carried out in an object-based manner. Since the chrominance shape information extracting part 330 receives only the luminance shape information via the transmission medium 200, it extracts chrominance shape information based on the received luminance shape information. The configuration and operation of this chrominance shape information extracting part 330 are the same as those of the chrominance shape information extracting unit 130 included in the coding unit 100. The extracted chrominance shape information is then applied to the texture information decoding part 340 and motion decoding and compensating part 350. The texture information decoding part 340 conducts decoding of texture information using the reconstructed shape information received from the shape information decoding part 320. The motion decoding and compensating part 350 conducts a motion compensated prediction using the motion information output from the motion information decoding part and the previous texture information output from the previous reconstructed VOP part 370. Since the motion compensated prediction should be conducted for every object regions, as in the motion compensated prediction in the coding process, the reconstructed shape information output from the shape information decoding part 320 is applied to the motion decoding and compensating part 350 so that it is used for the motion compensated prediction. A motion compensated prediction signal output from the motion decoding and compensating part 350 is added to the reconstructed texture information output from the texture information decoding part 340 in the adder 360, thereby recovering the associated object. The recovered object is then stored in the previous reconstructed VOP part 370 so that it is subsequently used in coding of a subsequent frame. The recovered object is also applied to the object-based chrominance filtering part 390 so that it is recovered into an original image signal.

As apparent from the above description, the present invention provides an image chrominance signal filtering method and apparatus in which object chrominance information and background chrominance information are extracted in an image format conversion process, based on shape information of luminance signals, and then decimation-filtered or interpolation-filtered. In accordance with the method and apparatus of the present invention, it is possible to avoid a color bleeding phenomenon occurring at the boundaries of objects in an image. Accordingly, there is an advantage in that a degradation in picture quality is prevented.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for filtering chrominance signals of an image using a decimation filter, comprising the steps of:

(A) if the number of source object chrominance samples existing in taps of said decimation filter is a positive integer less than the number of said filter taps, then determining whether a pixel, to be filtered, of an input image is an object chrominance pixel or a background chrominance pixel, based on shape information of luminance signals of said image;

(B) if it is determined at said step (A) that said pixel is a background chrominance pixel, then marking object chrominance samples existing in said filter taps, and reproducing background chrominance samples for said marked object chrominance samples, respectively;

(C) if it is determined at said step (A) that said pixel is an object chrominance pixel, then marking background chrominance samples existing in said filter taps, and reproducing object chrominance samples for said marked background chrominance samples, respectively; and (D) computing pixel values of all chrominance samples including said reproduced samples obtained after the completion of said step (B) or said step (C) using respective filter coefficients of said filter taps.

2. The method as claimed in claim 1, wherein:

said step (B) comprises the step of reproducing, as said background chrominance samples to be filtered, source background chrominance samples spatially nearest all source object chrominance samples existing in said filter taps; and said step (C) comprises the step of reproducing, as said object chrominance samples to be filtered, source object chrominance samples spatially nearest all source background chrominance samples existing in said filter taps.

3. The method as claimed in claim 2, wherein:

said step (B) comprises the step of if there are a plurality of source background chrominance samples spaced by the same distance from each of said source object chrominance samples, then reproducing one of said source background chrominance samples, which is spatially nearest a decimated object chrominance sample position, as each of said background chrominance samples to be filtered; and said step (C) comprises the step of if there are a plurality of source object chrominance samples spaced by the same distance from each of said source background chrominance samples, then reproducing one of said source object chrominance samples, which is spatially nearest a decimated background chrominance sample position, as each of said object chrominance samples to be filtered.

4. The method as claimed in claim 1, wherein said step (B) comprises the step of reproducing, as said background chrominance samples to be filtered, an average value of two source background chrominance samples spatially nearest all source object chrominance samples existing in said filter taps; and said step (C) comprises the step of reproducing, as said object chrominance samples to be filtered, an average value of two source object chrominance samples spatially nearest all source background chrominance samples existing in said filter taps.

5. The method as claimed in claim 4, wherein said step (B) comprises the step of if there is only one source background chrominance sample, which is spatially nearest all source object chrominance samples existing in said filter taps, then reproducing said source background chrominance sample as each of said background chrominance samples to be filtered; and said step (C) comprises the step of if there is only one source object chrominance sample, which is spatially nearest all source background chrominance samples existing in said filter taps, then reproducing said source object chrominance sample as each of said object chrominance samples to be filtered.

6. The method as claimed in claim 1, wherein:

said step (B) comprises the step of reproducing an average value of all source background chrominance samples existing in said filter taps for each of all source object chrominance samples existing in said filter taps; and said step (C) comprises the step of reproducing an average value of all source object chrominance samples existing in said filter taps for each of all source background chrominance samples existing in said filter taps.

7. A method for filtering chrominance signals of an image using a decimation filter, comprising the steps of:

(A) determining whether or not there are, in taps of said filter, chrominance samples associated with an object region different from that of chrominance samples to be filtered;

(B) if there are chrominance samples, to be filtered, associated with a different object region from that of other chrominance samples to be filtered, then marking said chrominance samples associated with said different object region, and reproducing, for said marked chrominance samples, a chrominance sample associated with the same object region as that of said other chrominance samples to be filtered; and (C) said step comprising the step of reproducing one of said other chrominance samples, which is spatially nearest all source chrominance samples existing in said filter taps while being associated with said different object region, as a chrominance sample to be filtered in replace of each of said marked chrominance samples.

8. The method as claimed in claim 7 wherein said step (B) comprises the step of if said other chrominance samples include a plurality of chrominance samples spaced by the same distance from each of said source chrominance samples associated with said different object region, then reproducing a source chrominance sample, which is spatially nearest a position of said source chrominance sample while being associated with said object region of said other chrominance samples, as a chrominance sample to be filtered in replace of each of said marked chrominance samples.

9. The method as claimed in claim 7, wherein said step (B) comprises the step of reproducing an average value of two source chrominance samples, which are associated with said object region of said other chrominance samples and spatially nearest all source chrominance samples existing in said filter taps while being associated with said different object region, as a chrominance sample to be filtered in replace of each of said marked chrominance samples.

10. The method as claimed in claim 9, wherein said step (B) comprises the step of if there is only one source chrominance sample, which is spatially nearest a position of each of said source chrominance samples while being associated with said object region of said other chrominance samples, then reproducing said source chrominance sample as a chrominance sample to be filtered in replace of each of said marked chrominance samples.

11. The method as claimed in claim 7, wherein said step (B) comprises the step of reproducing an average value of all source chrominance samples associated with said different object region, as a chrominance sample to be filtered in replace of all source chrominance samples existing in said filter taps while being associated with said different object region.

12. An apparatus for filtering chrominance signals of an image comprising a decimation filter adapted to compute pixel values using respective filter coefficients of filter taps thereof, said apparatus further comprising:

a background chrominance pixel reproducer for determining whether a pixel, to be filtered in accordance with a filtering operation, of an input image is an object chrominance pixel or a background chrominance pixel, based on chrominance shape information of said image, said background chrominance pixel reproducer serving to mark background chrominance pixel values existing in said filter taps, when it is determined that said pixel is an object chrominance pixel, and reproducing object chrominance pixel values for said marked background chrominance pixel values, respectively; and an object chrominance pixel reproducer for marking object chrominance pixel values existing in said filter taps, when said pixel is a background chrominance pixel, and reproducing background chrominance pixel values for said marked object chrominance pixel values, respectively.

13. The apparatus as claimed in claim 12, wherein:

said object chrominance pixel reproducer comprises an object chrominance pixel marker for marking said object chrominance pixel values existing in said filter taps, based on said chrominance shape information, so as to allow a reproduction for said object chrominance pixel values, and a marked-pixel value reproducer for reproducing a background chrominance pixel value for each of said pixel values marked by said object chrominance pixel marker; and said background chrominance pixel reproducer comprises a background chrominance pixel marker for marking said background chrominance pixel values existing in said filter taps, based on said chrominance shape information, so as to allow a reproduction for said background chrominance pixel values, and a marked-pixel value reproducer for reproducing an object chrominance pixel value for each of said pixel values marked by said background chrominance pixel marker.

14. The apparatus as claimed in claim 13, wherein said marked-pixel value reproducer comprises means for reproducing the pixel value of a chrominance signal, which is not marked and spatially nearest each of said marked pixel values, for said marked pixel value.

15. The apparatus as claimed in claim 13, wherein said marked-pixel value reproducer comprises means for reproducing an average value of two chrominance signals, which are not marked and spatially nearest each of said marked pixel values, for said marked pixel value.

16. The apparatus as claimed in claim 13, wherein said marked-pixel value reproducer comprises means for reproducing an average value of all chrominance signals, which are not marked while existing in said filter taps, for said marked pixel value.

17. A method for filtering chrominance signals of an image using an interpolation filter, comprising the steps of:

(A) if the number of decimated object chrominance samples existing in taps of said interpolation filter is a positive integer less than the number of said filter taps, then determining whether a pixel, to be filtered, of an input image is a decimated object chrominance pixel or a decimated background chrominance pixel, based on shape information of luminance signals of said image;

(B) if it is determined at said step (A) that said pixel is a decimated background chrominance pixel, then marking decimated object chrominance samples existing in said filter taps, and reproducing decimated background chrominance samples for said marked decimated object chrominance samples, respectively;

(C) if it is determined at said step (A) that said pixel is an decimated object chrominance pixel, then marking decimated background chrominance samples existing in said filter taps, and reproducing decimated object chrominance samples for said marked decimated background chrominance samples, respectively; and (D) computing pixel values of all chrominance samples including said reproduced samples obtained after the completion of said step (B) or said step (C) using respective filter coefficients of said filter taps.

18. The method as claimed in claim 17, wherein:

said step (B) comprises the step of if there are a plurality of decimated background chrominance samples spaced by the same distance from each of said decimated object chrominance samples, then reproducing one of said decimated background chrominance samples, which is spatially nearest a decimated object chrominance sample position, as each of said decimated background chrominance samples to be filtered; and said step (C) comprises the step of if there are a plurality of decimated object chrominance samples spaced by the same distance from each of said decimated background chrominance samples, then reproducing one of said decimated object chrominance samples, which is spatially nearest a decimated background chrominance sample position, as each of said decimated object chrominance samples to be filtered.

19. The method as claimed in claim 17, wherein said step (B) comprises the step of reproducing, as said decimated background chrominance samples to be filtered, an average value of two decimated background chrominance samples spatially nearest all decimated object chrominance samples existing in said filter taps; and said step (C) comprises the step of reproducing, as said decimated object chrominance samples to be filtered, an average value of two decimated object chrominance samples spatially nearest all decimated background chrominance samples existing in said filter taps.

20. The method as claimed in claim 19, wherein said step (B) comprises the step of if there is only one decimated background chrominance sample, which is spatially nearest all decimated object chrominance samples existing in said filter taps, then reproducing said decimated background chrominance sample as each of said decimated background chrominance samples to be filtered; and said step (C) comprises the step of if there is only one decimated object chrominance sample, which is spatially nearest all decimated background chrominance samples existing in said filter taps, then reproducing said decimated object chrominance sample as each of said decimated object chrominance samples to be filtered.

21. The method as claimed in claim 17, wherein:

said step (B) comprises the step of reproducing an average value of all decimated background chrominance samples existing in said filter taps for each of all decimated object chrominance samples existing in said filter taps; and said step (C) comprises the step of reproducing an average value of all decimated object chrominance samples existing in said filter taps for each of all decimated background chrominance samples existing in said filter taps.

22. A method for filtering chrominance signals of an image using an interpolation filter, comprising the steps of:

(A) determining whether or not there are, in taps of said filter, decimated chrominance samples associated with an object region different from that of decimated chrominance samples to be filtered; and (B) if there are decimated chrominance samples, to be filtered, associated with a different object region from that of other decimated chrominance samples to be filtered, then marking said decimated chrominance samples associated with said different object region, and reproducing, for said marked decimated chrominance samples, a decimated chrominance sample associated with the same object region as that of said other decimated chrominance samples to be filtered; and (C) computing pixel values of all decimated chrominance samples including said reproduced samples obtained after the completion of said step (B) using respective filter coefficients of said filter taps, thereby filtering said chrominance signals.

23. An apparatus for filtering chrominance signals of an image comprising an interpolation filter adapted to compute pixel values using respective filter coefficients of filter taps thereof, said apparatus further comprising:

a background chrominance pixel reproducer for determining whether a decimated chrominance pixel, to be filtered, of an input image is an object chrominance pixel or a background chrominance pixel, based on shape information of said image, said background chrominance pixel reproducer serving to mark background chrominance pixel values existing in said interpolation filter taps, when it is determined that said pixel is an object chrominance pixel, and reproducing object chrominance pixel values for said marked background chrominance pixel values, respectively; and an object chrominance pixel reproducer for marking object chrominance pixel values existing in said interpolation filter taps, when said pixel is a background chrominance pixel, and reproducing background chrominance pixel values for said marked object chrominance pixel values, respectively.

24. The apparatus as claimed in claim 23, wherein:

said object chrominance pixel reproducer comprises an object chrominance pixel marker for marking said object chrominance pixel values existing in said interpolation filter taps, based on said chrominance shape information, so as to allow a reproduction for said object chrominance pixel values, and a marked-pixel value reproducer for reproducing a background chrominance pixel value for each of said pixel values marked by said object chrominance pixel marker; and said background chrominance pixel reproducer comprises a background chrominance pixel marker for marking said background chrominance pixel values existing in said interpolation filter taps, based on said chrominance shape information, so as to allow a reproduction for said background chrominance pixel values, and a marked-pixel value reproducer for reproducing an object chrominance pixel value for each of said pixel values marked by said background chrominance pixel marker.

* * * * *